US012473142B2

(12) United States Patent
Rocholl et al.

(10) Patent No.: US 12,473,142 B2
(45) **Date of Patent: *Nov. 18, 2025**

(54) ELECTRIC SIDE LOADER ARMS FOR ELECTRIC REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Doge Center, MN (US); Wallace Buege, West Bend, WI (US); Caleb Binder, Oshkosh, WI (US); Martin J. Schimke, Red Granite, WI (US); Andrew Kotloski, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,284

(22) Filed: Jan. 30, 2024

(65) Prior Publication Data

US 2024/0166434 A1 May 23, 2024

Related U.S. Application Data

(63) Continuation of application No. 17/972,793, filed on Oct. 25, 2022, now Pat. No. 11,919,708, which is a (Continued)

(51) Int. Cl.
*B65F 3/04* (2006.01)
*B65F 3/02* (2006.01)

(52) U.S. Cl.
CPC ............ *B65F 3/041* (2013.01); *B65F 3/0203* (2013.01); *B65F 2003/023* (2013.01); *B65F 2003/025* (2013.01); *B65F 2003/0266* (2013.01)

(58) Field of Classification Search
CPC ................................ B65F 3/041; B65F 3/048
See application file for complete search history.

(56) References Cited

U.S. PATENT DOCUMENTS 1,151,479 A 8/1915 Kurtz
1,393,219 A 10/1921 George (Continued)

FOREIGN PATENT DOCUMENTS

CA 1264702 1/1990
CA 2121055 10/1995

(Continued)

OTHER PUBLICATIONS

Boivin Evolution Products, https://en.bev.ca/produits, Retrieved on Aug. 31, 2020, 3 pages.

(Continued)

*Primary Examiner* — Jonathan Snelting
(74) *Attorney, Agent, or Firm* — Foley & Lardner LLP

(57) ABSTRACT

A refuse vehicle includes a chassis, a body assembly, and an automated reach arm. The body assembly is coupled to the chassis and defines a refuse compartment configured to store refuse material. The automated reach arm includes a refuse container engagement mechanism, at least one electrically driven actuation mechanism, a first slew motor, and a second slew motor. The refuse container engagement mechanism is configured to selectively engage a refuse container. The at least one electrically driven actuation mechanism is configured to selectively actuate the automated reach arm between an extended position, a retracted position, and a refuse- (Continued)

dumping position. The first slew motor is configured to selectively swing the automated reach arm with respect to the body assembly about a first axis. The second slew motor is configured to selectively swing the refuse container engagement mechanism with respect to a second axis that is parallel to the first axis.

18 Claims, 26 Drawing Sheets

Related U.S. Application Data continuation of application No. 16/851,557, filed on Apr. 17, 2020, now Pat. No. 11,505,404.

(60) Provisional application No. 62/843,072, filed on May 3, 2019.

(56) References Cited

U.S. PATENT DOCUMENTS

| | | | |
|---|---|---|---|
| 2,263,199 | A | 11/1941 | Co |
| 3,195,744 | A | 7/1965 | Wender |
| 4,051,970 | A | 10/1977 | Ramsey |
| 4,219,298 | A | 8/1980 | Stragier et al. |
| 4,313,707 | A | 2/1982 | Bingman et al. |
| 4,364,593 | A | 12/1982 | Maeda |
| 4,401,407 | A | 8/1983 | Breckenridge |
| 4,461,608 | A | 7/1984 | Boda |
| 4,598,942 | A | 7/1986 | Shum et al. |
| 4,606,695 | A | 8/1986 | Lenz |
| 5,015,022 | A | 5/1991 | Mc Guire |
| 5,158,340 | A | 10/1992 | Boda |
| 5,280,981 | A | 1/1994 | Schulz |
| 5,391,039 | A | 2/1995 | Holtom |
| 5,421,689 | A | 6/1995 | Boivin |
| 5,498,067 | A | 3/1996 | Christenson |
| 5,505,576 | A | 4/1996 | Sizemore et al. |
| 5,527,098 | A | 6/1996 | McKinney et al. |
| 5,702,225 | A | 12/1997 | Ghibaudo |
| 5,720,589 | A | 2/1998 | Christenson et al. |
| 5,785,487 | A | 7/1998 | McNeilus et al. |
| 5,816,766 | A | 10/1998 | Clark |
| 5,833,428 | A | 11/1998 | Szinte |
| 5,919,027 | A | 7/1999 | Christenson |
| 5,934,858 | A | 8/1999 | Christenson |
| 5,934,867 | A | 8/1999 | Christenson |
| 5,938,394 | A | 8/1999 | Christenson |
| 5,951,235 | A | 9/1999 | Young et al. |
| 5,967,731 | A | 10/1999 | Brandt |
| 5,971,694 | A | 10/1999 | McNeilus et al. |
| 5,984,609 | A | 11/1999 | Bartlett |
| 5,988,970 | A | 11/1999 | Holtom |
| 5,988,972 | A | 11/1999 | Boivin |
| 6,033,176 | A | 3/2000 | Bartlett |
| 6,062,803 | A | 5/2000 | Christenson |
| 6,071,058 | A | 6/2000 | Tetz et al. |
| 6,089,813 | A | 7/2000 | McNeilus et al. |
| 6,095,744 | A | 8/2000 | Harrison |
| 6,120,235 | A | 9/2000 | Humphries et al. |
| 6,123,500 | A | 9/2000 | McNeilus et al. |
| 6,135,536 | A | 10/2000 | Ciavaglia et al. |
| 6,210,094 | B1 | 4/2001 | McNeilus et al. |
| 6,213,706 | B1 | 4/2001 | Christenson |
| 6,224,318 | B1 | 5/2001 | McNeilus et al. |
| 6,315,515 | B1 | 11/2001 | Young et al. |
| 6,336,783 | B1 | 1/2002 | Young et al. |
| 6,350,098 | B1 | 2/2002 | Christenson et al. |
| 6,390,758 | B1 | 5/2002 | McNeilus et al. |
| 6,447,239 | B2 | 9/2002 | Young et al. |
| 6,474,928 | B1 | 11/2002 | Christenson |
| 6,485,079 | B1 | 11/2002 | Brown et al. |
| 6,491,489 | B1 | 12/2002 | Stragier |
| 6,494,665 | B1 | 12/2002 | Bingman |
| 6,520,008 | B1 | 2/2003 | Stragier |
| 6,565,305 | B2 | 5/2003 | Schrafel |
| 6,799,790 | B2 | 10/2004 | Sakai et al. |
| 6,894,447 | B1 | 5/2005 | Friede et al. |
| 7,070,382 | B2 | 7/2006 | Pruteanu et al. |
| 7,073,620 | B2 | 7/2006 | Braun et al. |
| 7,198,130 | B2 | 4/2007 | Schimke |
| 7,258,194 | B2 | 8/2007 | Braun et al. |
| 7,284,943 | B2 | 10/2007 | Pruteanu et al. |
| 7,357,203 | B2 | 4/2008 | Morrow et al. |
| 7,448,460 | B2 | 11/2008 | Morrow et al. |
| 7,556,468 | B2 | 7/2009 | Grata |
| 7,559,735 | B2 | 7/2009 | Pruteanu et al. |
| 7,824,293 | B2 | 11/2010 | Schimke |
| 7,878,750 | B2 | 2/2011 | Zhou et al. |
| 7,931,103 | B2 | 4/2011 | Morrow et al. |
| 8,104,120 | B2 | 1/2012 | Hornbach et al. |
| 8,123,645 | B2 | 2/2012 | Schimke |
| 8,182,194 | B2 | 5/2012 | Pruteanu et al. |
| 8,215,892 | B2 | 7/2012 | Calliari |
| 8,251,420 | B2 | 8/2012 | Mizuno et al. |
| 8,337,352 | B2 | 12/2012 | Morrow et al. |
| 8,360,706 | B2 | 1/2013 | Addleman et al. |
| 8,540,475 | B2 | 9/2013 | Kuriakose et al. |
| 8,561,735 | B2 | 10/2013 | Morrow et al. |
| 8,807,613 | B2 | 8/2014 | Howell et al. |
| 8,864,613 | B2 | 10/2014 | Morrow et al. |
| 9,174,686 | B1 | 11/2015 | Messina et al. |
| 9,216,856 | B2 | 12/2015 | Howell et al. |
| 9,387,985 | B2 | 7/2016 | Gillmore et al. |
| 9,403,641 | B1 | 8/2016 | Ghibaudo |
| 9,428,042 | B2 | 8/2016 | Morrow et al. |
| 9,624,033 | B1 | 4/2017 | Price et al. |
| 9,650,032 | B2 | 5/2017 | Kotloski et al. |
| 9,651,120 | B2 | 5/2017 | Morrow et al. |
| 9,656,659 | B2 | 5/2017 | Shukla et al. |
| 9,707,869 | B1 | 7/2017 | Messina et al. |
| 9,834,377 | B1 | 12/2017 | Hayes et al. |
| 9,880,581 | B2 | 1/2018 | Kuriakose et al. |
| 9,908,520 | B2 | 3/2018 | Shukla et al. |
| 9,970,515 | B2 | 5/2018 | Morrow et al. |
| 9,981,803 | B2 | 5/2018 | Davis et al. |
| 10,029,555 | B2 | 7/2018 | Kotloski et al. |
| 10,029,556 | B2 | 7/2018 | Morrow et al. |
| 10,160,438 | B2 | 12/2018 | Shukla et al. |
| 10,174,868 | B2 | 1/2019 | Ditty et al. |
| 10,196,205 | B2 | 2/2019 | Betz et al. |
| 10,267,390 | B2 | 4/2019 | Morrow et al. |
| 10,301,111 | B2 | 5/2019 | Schell |
| 10,308,429 | B2 | 6/2019 | Mcneilus et al. |
| 10,357,995 | B2 | 7/2019 | Palmer et al. |
| 10,414,067 | B2 | 9/2019 | Datema et al. |
| 10,421,350 | B2 | 9/2019 | Morrow et al. |
| 10,435,026 | B2 | 10/2019 | Shively et al. |
| 10,457,134 | B2 | 10/2019 | Morrow et al. |
| 10,457,533 | B2 | 10/2019 | Puszkiewicz et al. |
| 10,558,234 | B2 | 2/2020 | Kuriakose et al. |
| 10,569,423 | B1 | 2/2020 | Jones et al. |
| 10,578,195 | B2 | 3/2020 | Steinberger et al. |
| 10,584,775 | B2 | 3/2020 | Steinberger et al. |
| 10,661,986 | B2 | 5/2020 | Price et al. |
| 10,703,356 | B2 | 7/2020 | Lacroix et al. |
| 10,730,190 | B2 | 8/2020 | Kouri |
| 10,801,243 | B2 | 10/2020 | Nakatomi et al. |
| 10,865,827 | B2 | 12/2020 | Gentry et al. |
| 11,001,440 | B2 | 5/2021 | Rocholl et al. |
| 11,254,500 | B2 | 2/2022 | Buege et al. |
| 11,401,109 | B2 * | 8/2022 | Searle ................... B65F 3/0203 |
| 11,505,404 | B2 | 11/2022 | Rocholl et al. |
| 11,919,708 | B2 * | 3/2024 | Rocholl ................ B65F 3/0203 |
| 2002/0154973 | A1 | 10/2002 | Bradshaw et al. |
| 2004/0177934 | A1 | 9/2004 | Olmsted |
| 2006/0280582 | A1 | 12/2006 | Kouri |
| 2011/0240777 | A1 | 10/2011 | Johns et al. |
| 2012/0261931 | A1 | 10/2012 | Kang |
| 2014/0269145 | A1 | 9/2014 | Fasana et al. |
| 2015/0151433 | A1 | 6/2015 | Rust et al. |
| 2016/0044285 | A1 | 2/2016 | Gasca et al. |
| 2017/0044815 | A1 | 2/2017 | Watanabe |

(56) References Cited

U.S. PATENT DOCUMENTS

| | | | |
|---|---|---|---|
| 2018/0155124 | A1 | 6/2018 | Kay et al. |
| 2018/0250847 | A1 | 9/2018 | Wurtz et al. |
| 2018/0326832 | A1 | 11/2018 | Kotloski et al. |
| 2019/0091890 | A1 | 3/2019 | Rocholl et al. |
| 2019/0111910 | A1 | 4/2019 | Shukla et al. |
| 2019/0121353 | A1 | 4/2019 | Datema et al. |
| 2019/0161272 | A1 | 5/2019 | Betz et al. |
| 2019/0193934 | A1 | 6/2019 | Rocholl et al. |
| 2019/0242460 | A1 | 8/2019 | Morrow et al. |
| 2019/0322321 | A1 | 10/2019 | Schwartz et al. |
| 2019/0325220 | A1 | 10/2019 | Wildgrube et al. |
| 2019/0344475 | A1 | 11/2019 | Datema et al. |
| 2019/0360600 | A1 | 11/2019 | Jax et al. |
| 2019/0366828 | A1 | 12/2019 | Morrow et al. |
| 2020/0031641 | A1 | 1/2020 | Puszkiewicz et al. |
| 2020/0039341 | A1 | 2/2020 | Morrow et al. |
| 2020/0078986 | A1 | 3/2020 | Clifton et al. |
| 2020/0102145 | A1 | 4/2020 | Nelson et al. |
| 2020/0180860 | A1 | 6/2020 | Searle et al. |
| 2020/0200237 | A1 | 6/2020 | Steinberger et al. |
| 2020/0200238 | A1 | 6/2020 | Steinberger et al. |
| 2020/0230841 | A1 | 7/2020 | Datema et al. |
| 2020/0230842 | A1 | 7/2020 | Datema et al. |
| 2020/0262328 | A1 | 8/2020 | Nelson et al. |
| 2020/0262366 | A1 | 8/2020 | Wildgrube et al. |
| 2020/0265656 | A1 | 8/2020 | Koga et al. |
| 2021/0039880 | A1 | 2/2021 | Boivin et al. |
| 2021/0122568 | A1 | 4/2021 | Boivin et al. |

FOREIGN PATENT DOCUMENTS

| | | | | | |
|---|---|---|---|---|---|
| CA | 2373724 | | | 8/2003 | |
| CA | 3072106 | | | 2/2019 | |
| CN | 105210518 | | | 1/2016 | |
| CN | 105501766 | B | | 3/2018 | |
| CN | 107985873 | A | | 5/2018 | |
| DE | 10 2006 032 206 | A1 | | 1/2008 | |
| DE | 10 2007 026 418 | A1 | | 12/2008 | |
| DE | 10 2008 013 940 | A1 | | 9/2009 | |
| EP | 0 620 167 | B1 | | 10/1994 | |
| EP | 1 389 591 | A1 | | 2/2004 | |
| EP | 3 248 911 | A1 | | 11/2017 | |
| GB | 1 058 070 | A | | 2/1967 | |
| GB | 2 129 086 | A | | 5/1984 | |
| GB | 2 405 395 | A | | 3/2005 | |
| JP | H11-168925 | A | | 6/1999 | |
| JP | 2016-068200 | A | | 5/2016 | |
| WO | WO-2019/033201 | A1 | | 2/2019 | |
| WO | WO-2019028514 | A1 | * | 2/2019 | ............ B65F 3/0203 |
| WO | WO-2021/068063 | A1 | | 4/2021 | |

OTHER PUBLICATIONS

Boivin Evolution, Introducing the First 100% Electric Automated Arm and Collection Body, URL: https://www.bev.ca/upload/files/BEV_Arm_and_collection_body_Diesel.pdf, first published on Jun. 3, 2019, 2 pps.

Lion Electric & Boivin Evolution Start Selling Electric Garbage Truck, Clean Technica, URL: https://cleantechnica.com/2020/07/13/lion-electric-boivin-evolution-start-selling-electric-garbage-truck/, first published Jul. 13, 2020, 9 pps.

Lion Electric on Twitter: https://twitter.com/LionElectricCo/status/1280202671379509248?ref_src=twsrc%5Etfw%7Ctwcamp%5Etweetembed%7Ctwterm%5E1280202671379509248%7Ctwgr%5E%7Ctwcon%5Es1_&ref_url=https%3A%2F%2Fcleantechnica.com%2F2020%2F07%2F13%2Flion-electric-boivin-evolution-start-selling-electric-garbage-truck%2F, first published on Jul. 6, 2020, 7 pps.

* cited by examiner

ELECTRIC SIDE LOADER ARMS FOR ELECTRIC REFUSE VEHICLE

CROSS-REFERENCE TO RELATED APPLICATION

This application is a continuation of U.S. application Ser. No. 17/972,793, filed Oct. 25, 2022, which is a continuation of U.S. application Ser. No. 16/851,557, now U.S. Pat. No. 11,505,404, filed Apr. 17, 2020, which claims the benefit of U.S. Provisional Application No. 62/843,072, filed May 3, 2019, which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One exemplary embodiment relates to a refuse vehicle. The refuse vehicle comprises a chassis, a body assembly, a power source, and a side-loading lift assembly. The chassis is coupled to a plurality of wheels. The body assembly is coupled to the chassis and defines a refuse compartment configured to store refuse material. The side-loading lift assembly comprises a refuse container engagement mechanism and at least one electrically-driven actuation mechanism. The refuse container engagement mechanism is powered by the power source and is configured to selectively engage a refuse container. The at least one electrically-driven actuation mechanism is powered by the power source and is configured to selectively actuate the side-loading lift assembly between an extended position, a retracted position, and a refuse-dumping position.

Another exemplary embodiment relates to a refuse vehicle. The refuse vehicle comprises a chassis, a body assembly, a power source, and a side-loading lift assembly. The chassis is coupled to a plurality of wheels. The body assembly is coupled to the chassis and defines a refuse compartment configured to store refuse material. The side-loading lift assembly comprises a grabber mechanism and at least one electrically-driven actuation mechanism. The grabber mechanism includes grabber fingers and a grabber motor. The grabber motor is powered by the power source and is configured to selectively move the grabber fingers between a receiving position, where the grabber mechanism is configured to receive a refuse container, and a grasping position, where the grabber mechanism is configured to engage the refuse container. The at least one electrically-driven actuation mechanism is powered by the power source and is configured to selectively actuate the side-loading lift assembly between an extended position, a retracted position, and a refuse-dumping position.

Another exemplary embodiment relates to a refuse vehicle. The refuse vehicle comprises a chassis, a body assembly, a power source, and an automated reach arm. The chassis is coupled to a plurality of wheels. The body assembly is coupled to the chassis and defines a refuse compartment configured to store refuse material. The automated reach arm comprises a refuse container engagement mechanism, a first articulating arm segment, a second articulating arm segment, and at least one electrically-driven actuation mechanism. The refuse container engagement mechanism is powered by the power source and is configured to selectively engage a refuse container. The first articulating arm segment has a first end and a second end. The first articulating arm segment is hingedly coupled to the body assembly at the first end of the first articulating arm segment. The second articulating arm segment has a first end and a second end. The second articulating arm segment is hingedly coupled to the second end of the first articulating arm segment at the first end of the second articulating arm segment and is hingedly coupled to the refuse container engagement mechanism at the second end of the second articulating arm segment. The at least one electrically-driven actuation mechanism is powered by the power source and is configured to selectively rotate the first articulating arm segment and the second articulating arm segment with respect to one another to selectively actuate the automated reach arm between an extended position, a retracted position, and a refuse-dumping position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a loader arm system may incorporate various electrically-powered actuators and the like to effectively lift and manipulate waste receptacles to empty the contents thereof into a hopper volume of a refuse vehicle. That is, the electrically-actuated loader arm system may function without the inclusion of high-pressure, leak-prone hydraulic tanks, hydraulic lines, and hydraulic fluid generally. Thus, the electrically actuated loader arm system may allow for reduced maintenance and upkeep as compared to traditional hydraulically actuated loader arm systems.

Overall Vehicle

Figure 1:
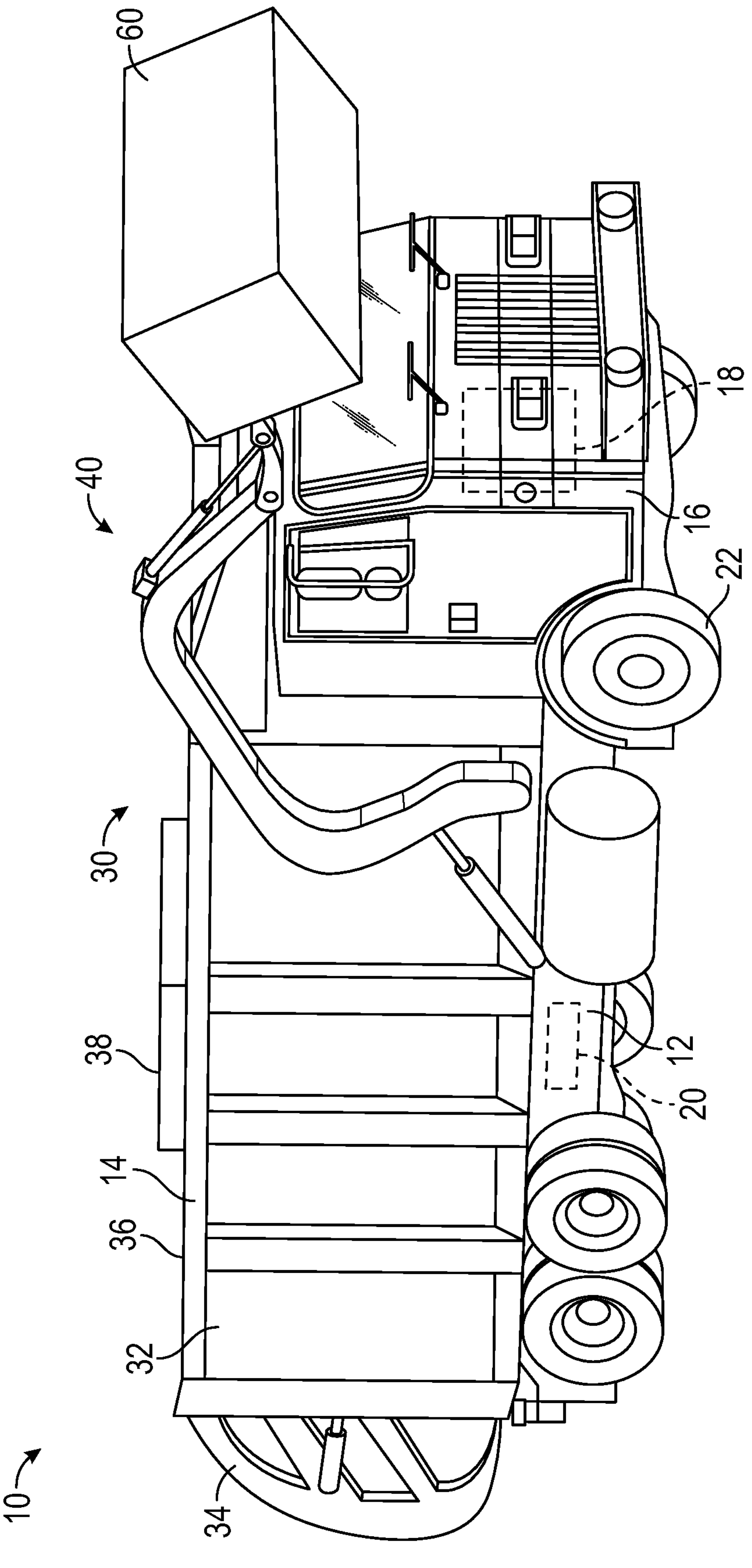
FIG. 1 is a perspective view of a refuse vehicle, according to an exemplary embodiment.
Figure 6:
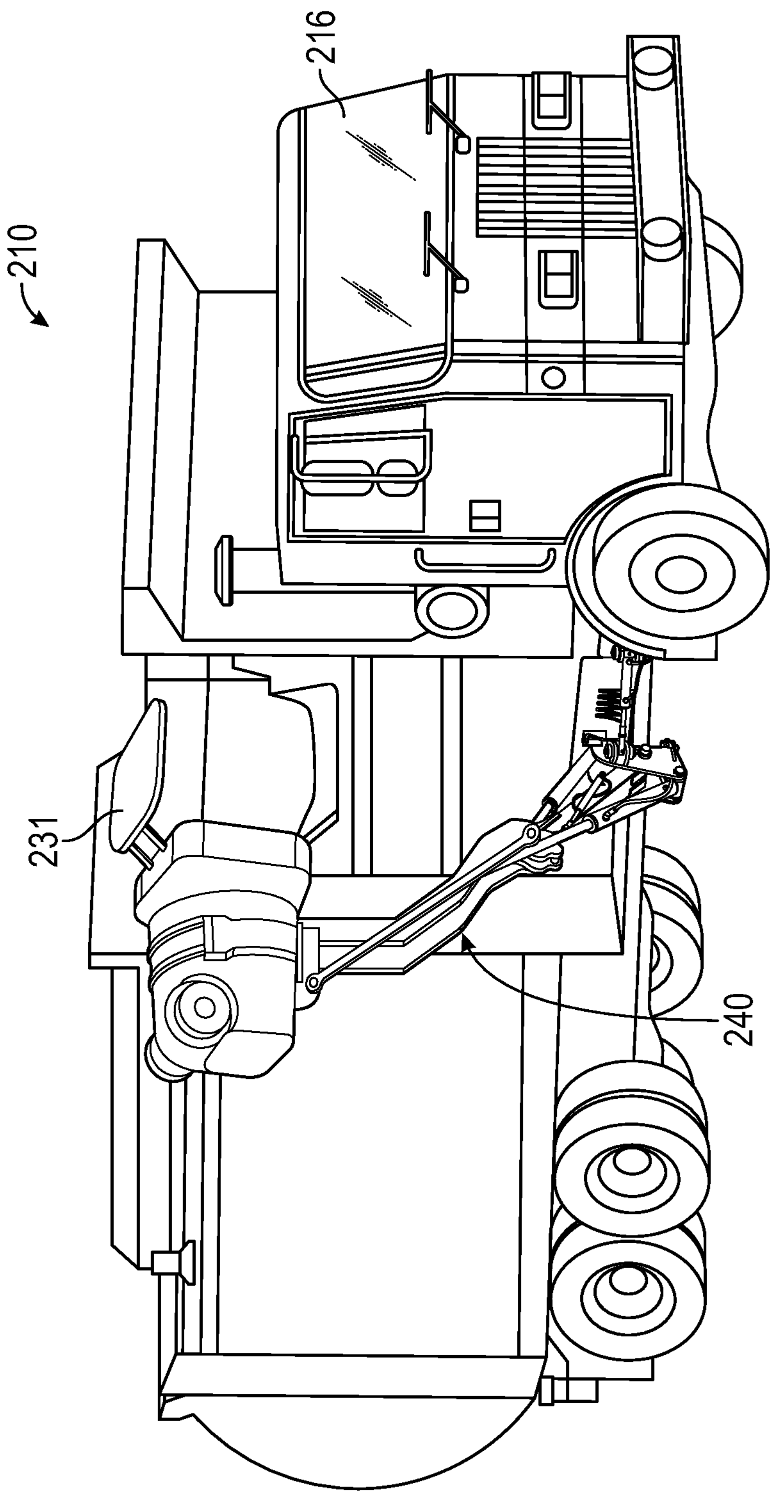
FIG. 6 is a perspective view of the refuse vehicle of FIG. 2, shown with the auto reach arm in a refuse-dumping position, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck (e.g., FIGS. 2 and 6) or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and a power source, shown as battery system 20. In other embodiments, the prime mover is or includes an internal combustion engine. According to the exemplary embodiment shown in FIG. 1, the electric motor 18 is coupled to the frame 12 at a position beneath the cab 16. In some exemplary embodiments, the electric motor 18 may be coupled to the frame 12 at a position within or behind the cab 16.

The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independent driving of one or more of the wheels 22. In still other embodiments, the electric motor 18 or a secondary electric motor is coupled to and configured to drive a hydraulic system that powers hydraulic actuators. According to the exemplary embodiment shown in FIG. 1, the battery system 20 is coupled to the frame 12 beneath the body 14. In other embodiments, the battery system 20 is otherwise positioned (e.g., within a tailgate of the refuse vehicle 10, beneath the cab 16, along the top of the body 14, within the body 14).

According to an exemplary embodiment, the battery system 20 is configured to (a) receive, generate, and/or store power and (b) provide electric power to (i) the electric motor 18 to drive the wheels 22, (ii) electric actuators and/or pumps of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The battery system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the battery system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The battery system 20 may thereby be charged via an on-board electrical energy generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the battery system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility.

According to the embodiment shown in FIG. 1, the body 14 and the refuse compartment 30 are positioned behind the cab 16. In some embodiments, at least a portion of the body 14 and the refuse compartment 30 extend above or in front of the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30). For example, in these instances, the refuse vehicle 10 may be a front-loading refuse vehicle or a side-loading refuse vehicle). In other embodiments, the storage volume is positioned between the hopper volume and the cab 16. For example, in these instances, the refuse vehicle 10 may be a rear-loading refuse vehicle.

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind or bumps in the road).

Electric Side Loader

Figure 2:
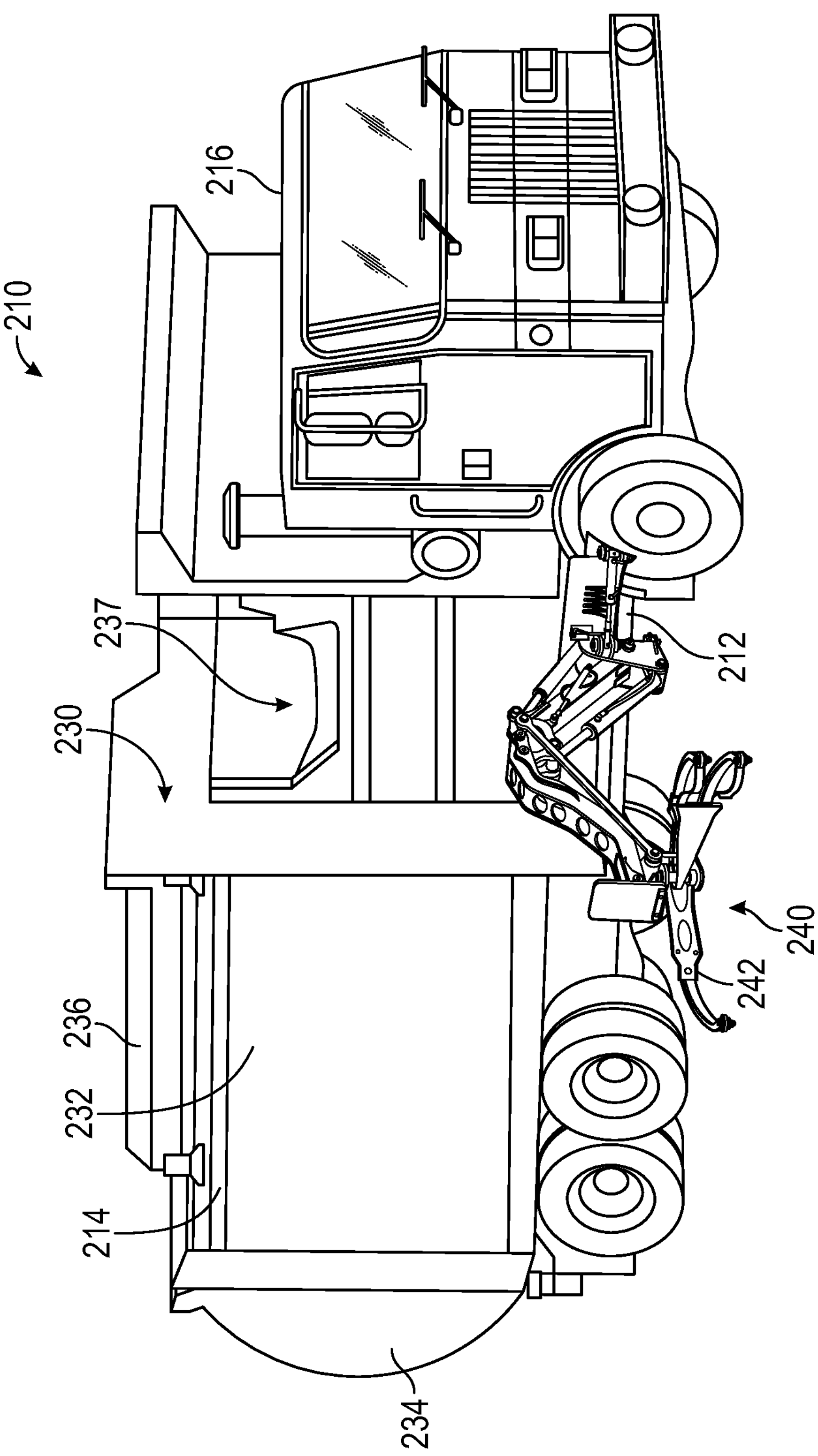
FIG. 2 is a perspective view of another refuse vehicle, according to an exemplary embodiment.

As shown in FIG. 2, a vehicle, shown as refuse vehicle 210 is configured as a side-loading refuse vehicle. The side-loading refuse vehicle 210 includes a frame 212, similar to the frame 12; a body assembly, shown as body 214, coupled to the frame 212; and a cab, shown as cab 216. The refuse vehicle 210 also includes an electric motor, similar to the electric motor 18, and an battery system, similar to the battery system 20.

As shown in FIG. 2, the body 214 similarly includes a collection chamber (e.g., hopper, etc.), shown as refuse compartment 230, defined by a panel 232, a tailgate 234, and a cover 236. According to an exemplary embodiment, the refuse compartment 230 further includes an opening 237 configured to receive refuse from a refuse container 231 (shown in FIG. 6), such as, for example, a residential trash receptacle, a commercial trash receptacle, a container having a robotic grabber arm, or any other suitable trash receptacle. In some instances, the opening 237 may be disposed proximate the top of the refuse compartment 230 (as shown in FIG. 2) or proximate the bottom of the refuse compartment (as shown by refuse compartment 330 in FIG. 7) depending on a type of lift mechanism/system employed (e.g., auto reach arm mechanism, automated extension arm mechanism, etc.).

According to an exemplary embodiment, the battery system is configured to provide electric power to a lift mechanism/system (e.g., a side-loading lift assembly, etc.), shown as automated reach arm 242. As shown in FIG. 2, the automated reach arm 242 is coupled to and extends from a side of the body 214. The automated reach arm 242 is configured to engage the refuse container 231. As will be described below, the automated reach arm 242 includes various electrically driven actuators and/or motors to facilitate manipulation of the refuse container 231. For example, the various electrically-driven actuators and/or motors of the automated reach arm 242 allow for the automated reach arm 242 to engage the refuse container 231, lift the refuse container 231, tip refuse out of the refuse container 231 into the hopper volume of the refuse compartment 230 through the opening 237, and return the empty refuse container 231 to the ground.

Figure 3:
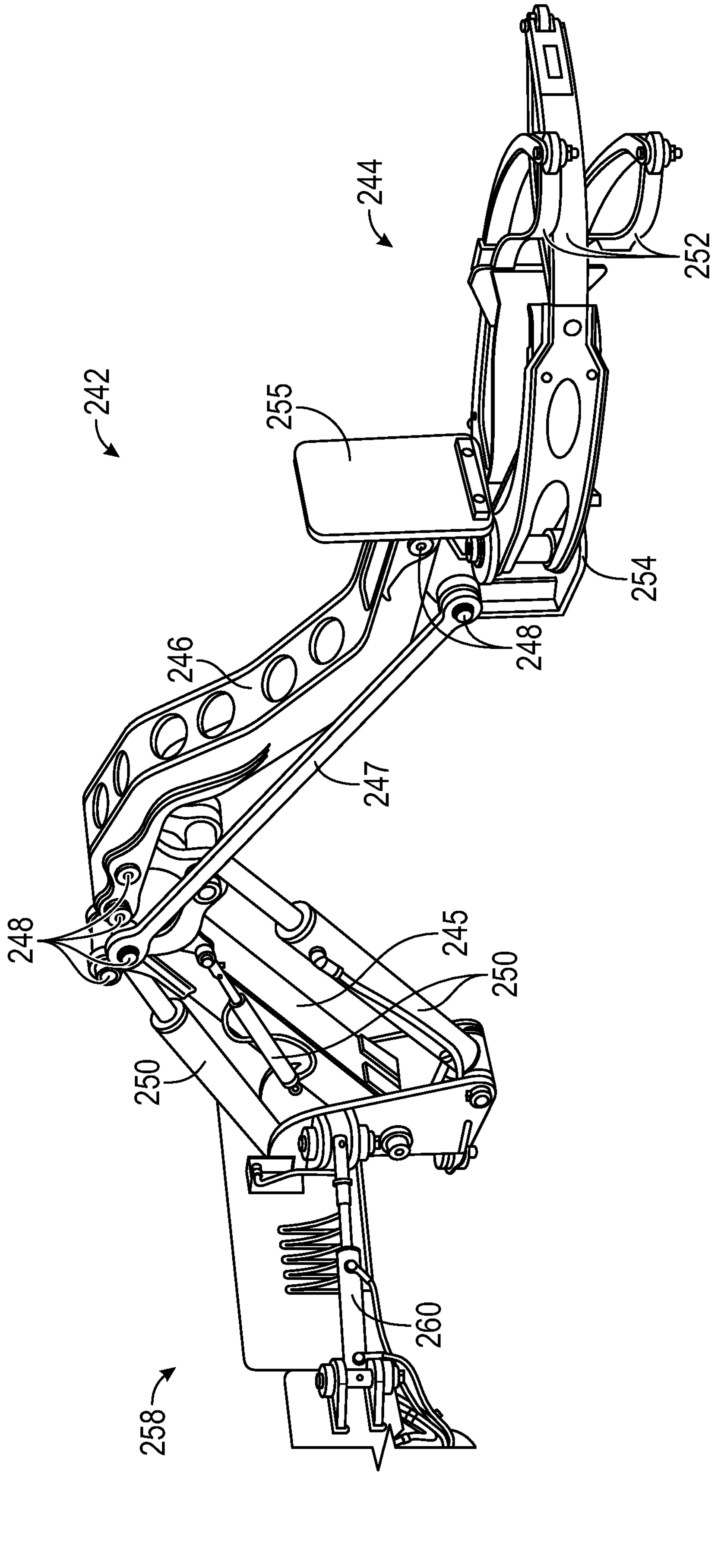
FIG. 3 is a perspective view of an auto reach arm configured for use with the refuse vehicle of FIG. 2, shown in an extended position, according to an exemplary embodiment.
Figure 4:
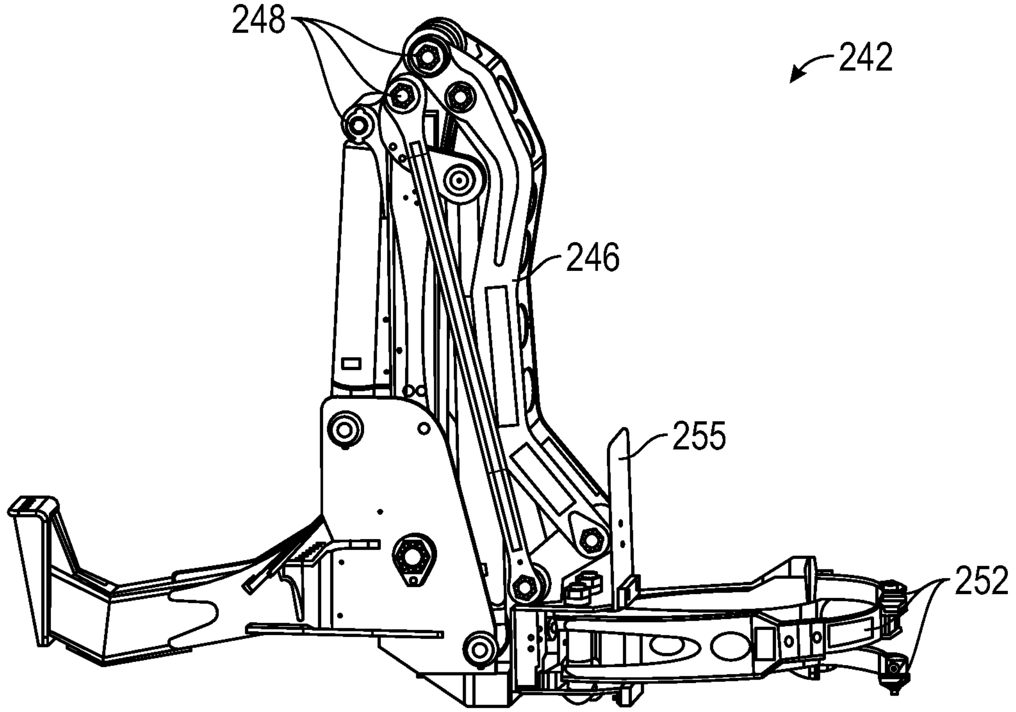
FIG. 4 is a side view of the auto reach arm of FIG. 3, shown in a retracted position, according to an exemplary embodiment.
Figure 5:
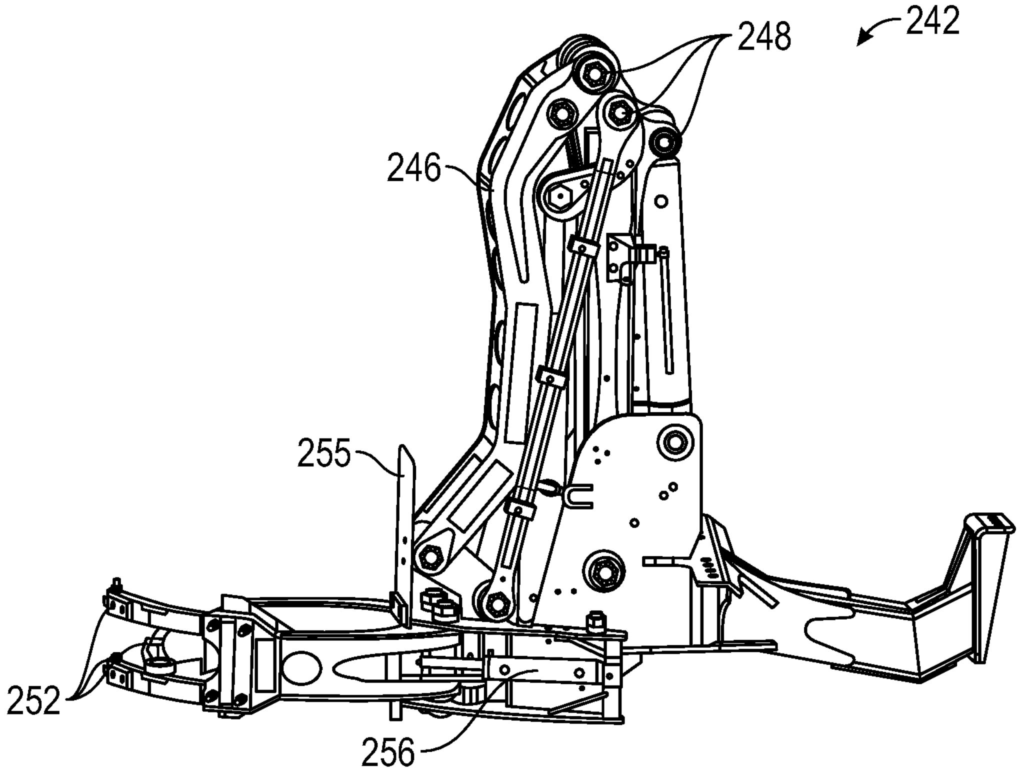
FIG. 5 is another side view of the auto reach arm of FIG. 3, shown in the retracted position, according to an exemplary embodiment.

As shown in FIGS. 3-5, in an exemplary embodiment, the automated reach arm 242 is coupled to and extends from the side of the body 214 (shown in FIG. 2). The automated reach arm 242 is actuatable between an extended position (shown in FIG. 3), a retracted position (shown in FIGS. 4 and 5), and a refuse-dumping position (shown in FIG. 6). The automated reach arm 242 includes a refuse container engagement mechanism, shown as grabber mechanism 244, a first articulating arm segment 245 (shown in FIG. 3), a second articulating arm segment 246, and a grabber mechanism leveling arm segment 247 (shown in FIG. 3) connected by various joints 248.

Specifically, as best illustrated in FIG. 3, the first articulating arm segment 245 is hingedly coupled to a swing mechanism 258 at a first end and hingedly coupled to both the second articulating arm segment 246 and the grabber mechanism leveling arm segment 247 at a second end. The second articulating arm segment 246 is hingedly coupled to the first articulating arm segment 245 at a first end and the grabber mechanism 244 at a second end. The grabber mechanism leveling arm segment 247 is similarly hingedly coupled to the first articulating arm segment 245 at a first end and the grabber mechanism 244 at a second end. The grabber mechanism leveling arm segment 247 is configured to ensure that the grabber mechanism 244 remains level to the ground as the automated reach arm 242 is moved between the extended position and the retracted position. That is, the arrangement and coupling between the first articulating arm segment 245, the second articulating arm segment 246, the grabber mechanism leveling arm segment 247, and the grabber mechanism 244 ensures that the grabber mechanism 244 remains level to the ground as the automated reach arm 242 is moved between the extended position and the retracted position.

The automated reach arm 242 further includes a plurality of linear arm actuators 250 coupled to various locations on the plurality of arm segments 245, 246, 247. The plurality of linear arm actuators 250 are arranged between various arm segments 245, 246, 247 to provide selective actuation of the automated reach arm 242 between the extended position and the retracted position.

The grabber mechanism 244 includes grabber fingers 252 rotatably coupled to a central attachment portion 254. The central attachment portion 254 further includes a bumper plate 255. As best shown in FIG. 5, the grabber mechanism 244 further includes a grabber linear actuator 256. The grabber linear actuator 256 is configured to selectively actuate the grabber fingers 252 between an opened or receiving position (shown in FIG. 2) and a closed or grasping position (shown in FIGS. 3-5).

As shown in FIG. 3, in some embodiments, the automated reach arm 242 may further include the swing mechanism 258. The swing mechanism 258 includes a linear swing actuator 260 configured to selectively swing the automated reach arm 242 laterally (or side-to-side), with respect to the ground.

In some exemplary embodiments, each of the various actuators 250, 256, 260 are electrically-driven linear actuators. For example, in some embodiments, the various actuators 250, 256, 260 are each one of a lead screw/lead nut type actuator, a lead screw/ball nut type actuator, a lead screw/roller nut type actuator, a linear motor, or any other suitable type of electrically driven linear actuator. The incorporation of electrically-driven linear actuators may reduce or eliminate leak points associated with traditional hydraulic components.

In some embodiments, the various actuators 250, 256, 260 may all be the same type of electrically driven linear actuator. In some other embodiments, the various actuators 250, 256, 260 may be varying types of electrically driven linear actuators, as deemed suitable for a given application. For example, one or more of the various actuators 250, 256, 260 may require a higher maximum linear force output than one or more other of the various actuators 250, 256, 260. As such, linear actuators capable of providing higher linear force output (e.g., lead screw/ball nut type actuator, lead screw/roller nut type actuator, etc.) may be used accordingly.

Further, each of the various actuators 250, 256, 260 may be powered by the battery system and in communication with a controller configured to allow an operator to selectively control actuation of the various actuators 250, 256, 260. As such, during operation, an operator can selectively extend the automated reach arm 242, with the grabber mechanism 244 in the opened or receiving position, toward a refuse container 231. In some instances, prior to extending the automated reach arm 242, the operator can selectively swing the automated reach arm 242 using the swing mechanism 258 to better align the grabber mechanism 244 with the refuse container 231.

With the grabber mechanism 244 aligned with the refuse container 231 and the automated reach arm 242 extended, the operator can then selectively move the grabber mechanism 244 into the closed or grasping position to engage the refuse container 231. The operator can then selectively move the automated reach arm 242 to the refuse-dumping position to dump the refuse into the opening 237. Once the refuse has been dumped, the operator can then selectively move the automated reach arm 242 back to the extended position and the grabber mechanism 244 into the opened position to place the refuse container 231 back on the ground. The operator can then move the automated reach arm 242 back into the retracted position and drive to a subsequent location.

Figure 7:
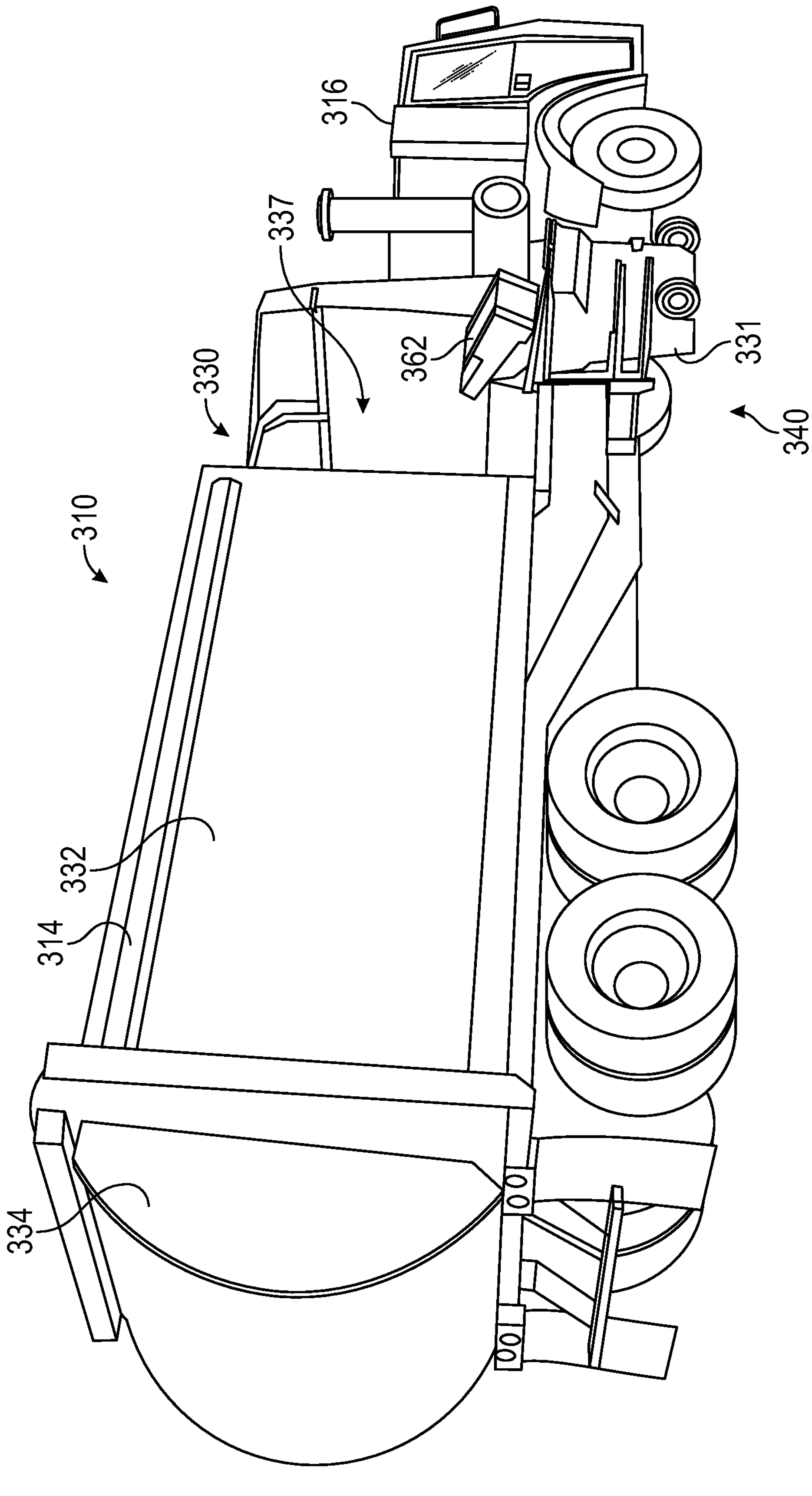
FIG. 7 is a perspective view of another refuse vehicle, according to an exemplary embodiment.

Referring now to FIG. 7, another refuse vehicle, shown as refuse vehicle 310, is shown, according to an exemplary embodiment. The refuse vehicle 310 may be substantially similar to the refuse vehicle 210, described above, with reference to FIGS. 2-6. Accordingly, the following description will focus on the various differences between the refuse vehicle 310 and the refuse vehicle 210. The refuse vehicle 310 includes a side-loading lift assembly, shown as automated extension arm 342. The automated extension arm 362 is similarly actuatable between an extended position (shown in FIG. 8) and a retracted position (shown in FIG. 7). The automated extension arm 362 is coupled to and extends from the side of a body 314 of the refuse vehicle 310.

Figure 8:
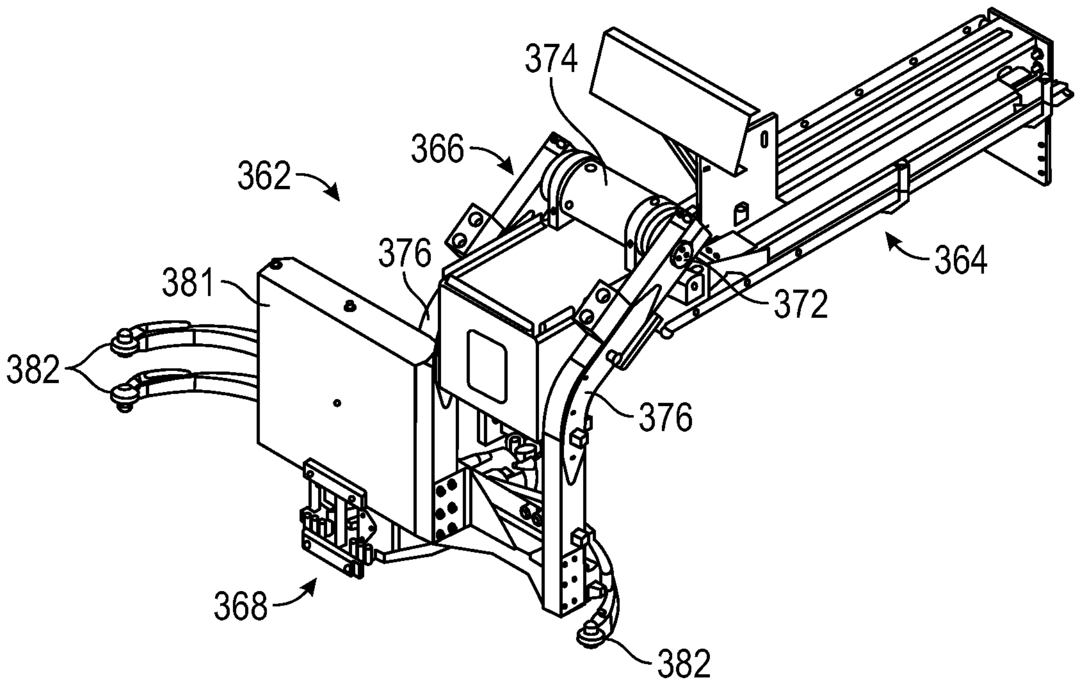
FIG. 8 is a perspective view of an automated extension arm configured for use with the refuse vehicle of FIG. 7, shown in a retracted position, according to an exemplary embodiment.
Figure 9:
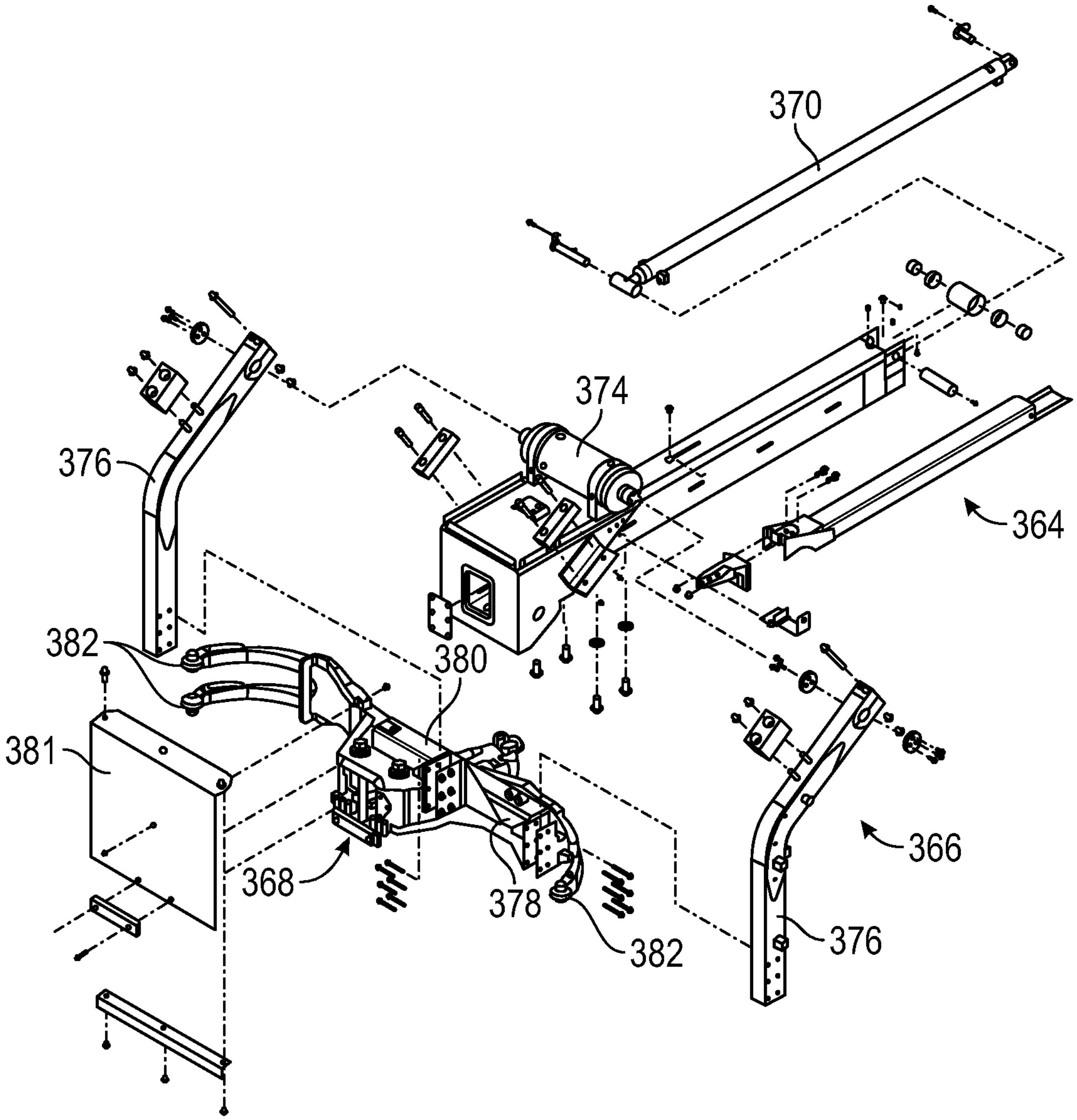
FIG. 9 is an exploded view of the automated extension arm of FIG. 8, according to an exemplary embodiment.

As best illustrated in FIGS. 8 and 9, the automated extension arm 362 includes an extension mechanism 364, a tilt mechanism 366, and a grabber mechanism 368, similar to the grabber mechanism 244 of the refuse vehicle 210. The extension mechanism 364 includes a linear extension actuator 370 (shown in FIG. 9) configured to actuate the automated extension arm 362 between the extended position and the retracted position. A distal end of the extension mechanism 364 is hingedly coupled to the tilt mechanism 366 at a joint 372.

The tilt mechanism 366 includes a tilt actuation motor 374 and a pair of tilt arms 376 connected at a distal end by a cross-member 378 (shown in FIG. 9). The tilt actuation motor 374 is configured to selectively rotate the pair of tilt arms 376 about the joint 372. The distal end of the pair of tilt arms 376 is further coupled to a central attachment portion 380 (shown in FIG. 9) of the grabber mechanism 368.

Figure 10:
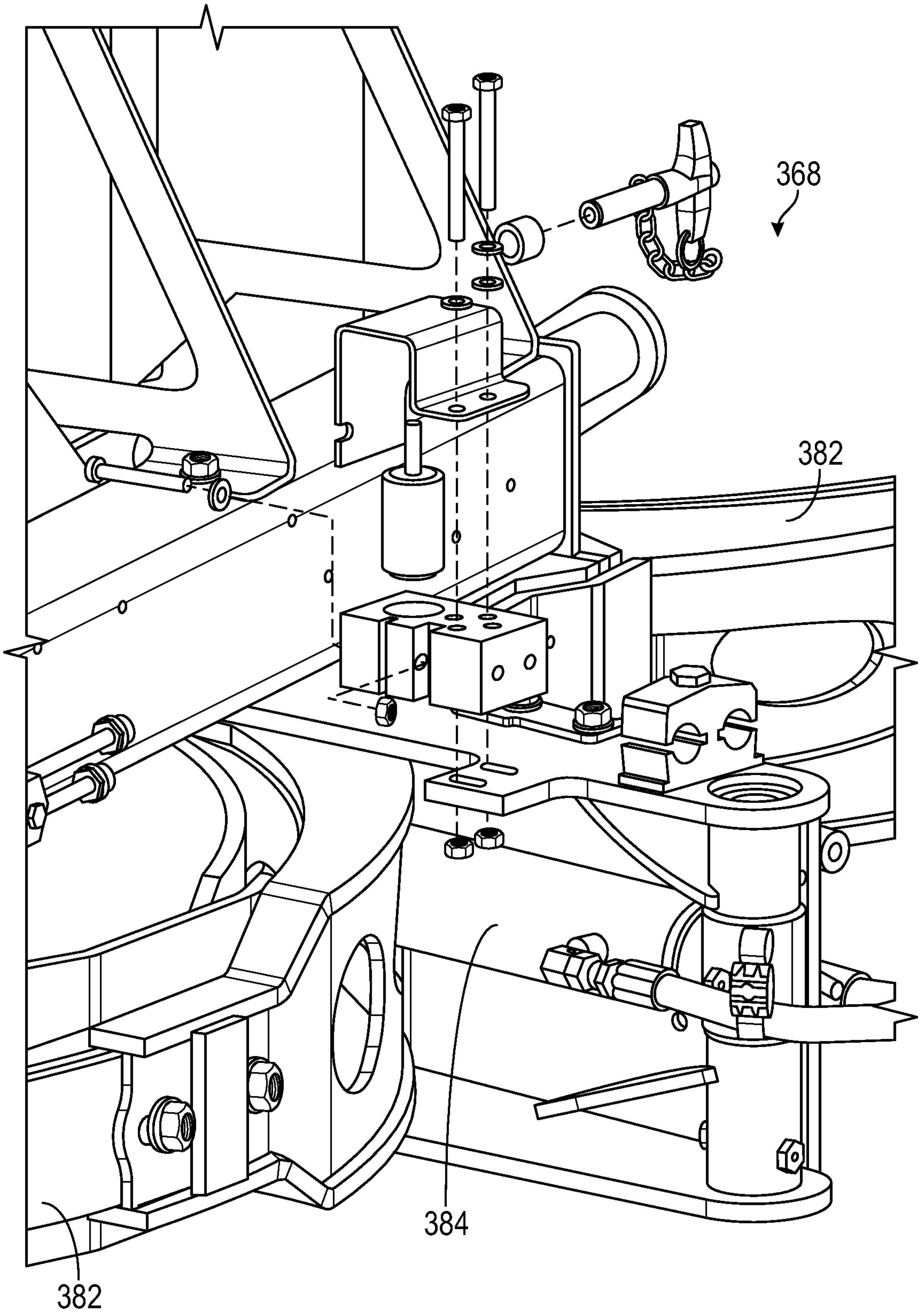
FIG. 10 is a detail view of the automated extension arm of FIG. 8, showing a grabber linear actuator, according to an exemplary embodiment.

Similar to the grabber mechanism 244, the grabber mechanism 368 includes grabber fingers 382 rotatably coupled to the central attachment portion 380. The central attachment portion 380 further includes a bumper plate 381. As best shown in FIG. 10, the grabber mechanism 368 further includes a grabber linear actuator 384. The grabber linear actuator 384 is configured to selectively actuate the pair of grabber fingers 382 between an opened or receiving position (shown in FIG. 8) and a closed or grasping position (shown in FIG. 7).

In some exemplary embodiments, each of the various actuators 370, 384 are electrically driven linear actuators. For example, in some embodiments, the various actuators 370, 384 are each one of a lead screw/lead nut type actuator, a lead screw/ball nut type actuator, a lead screw/roller nut type actuator, a linear motor, or any other suitable type of electrically driven linear actuator.

In some embodiments, the various actuators 370, 384 may all be the same type of electrically driven linear actuator. In some other embodiments, the various actuators 370, 384 may be varying types of electrically driven linear actuators, as deemed suitable for a given application. For example, one or more of the various actuators 370, 384 may require a higher maximum linear force output than one or more other of the various actuators 370, 384. As such, linear actuators capable of providing higher linear force output (e.g., lead screw/ball nut type actuator, lead screw/roller nut type actuator, etc.) may be used accordingly.

Further, each of the various actuators 370, 384 may similarly be powered by the battery system and in communication with the controller to allow the operator to selectively control actuation of the various actuators 370, 384. As such, during operation, an operator can selectively extend the automated extension arm 362 with the grabber mechanism 368 in the opened or receiving position toward the refuse container 331. Then, with the grabber mechanism 368 aligned with the refuse container 331, the operator can selectively move the grabber mechanism 368 into the closed or grasping position to engage the refuse container 331. The operator can then selectively move the automated extension arm 362 to the retracted position to bring the refuse container 331 close to the refuse vehicle 310. With the refuse container 331 close to the refuse vehicle 310, the operator can use the tilt mechanism 366 to rotate the grabber mechanism 368 toward the opening 337, thereby dumping the refuse into the opening 337. Once the refuse has been dumped, the operator can then use the tilt mechanism 366 to rotate the grabber mechanism 368 toward the ground to place the refuse container 331 back on the ground, and can push the refuse container 331 back to its original position by extending the extension mechanism 364. The operator can then move the grabber mechanism 368 back into the opened position to release the refuse container 331.

Figure 11:
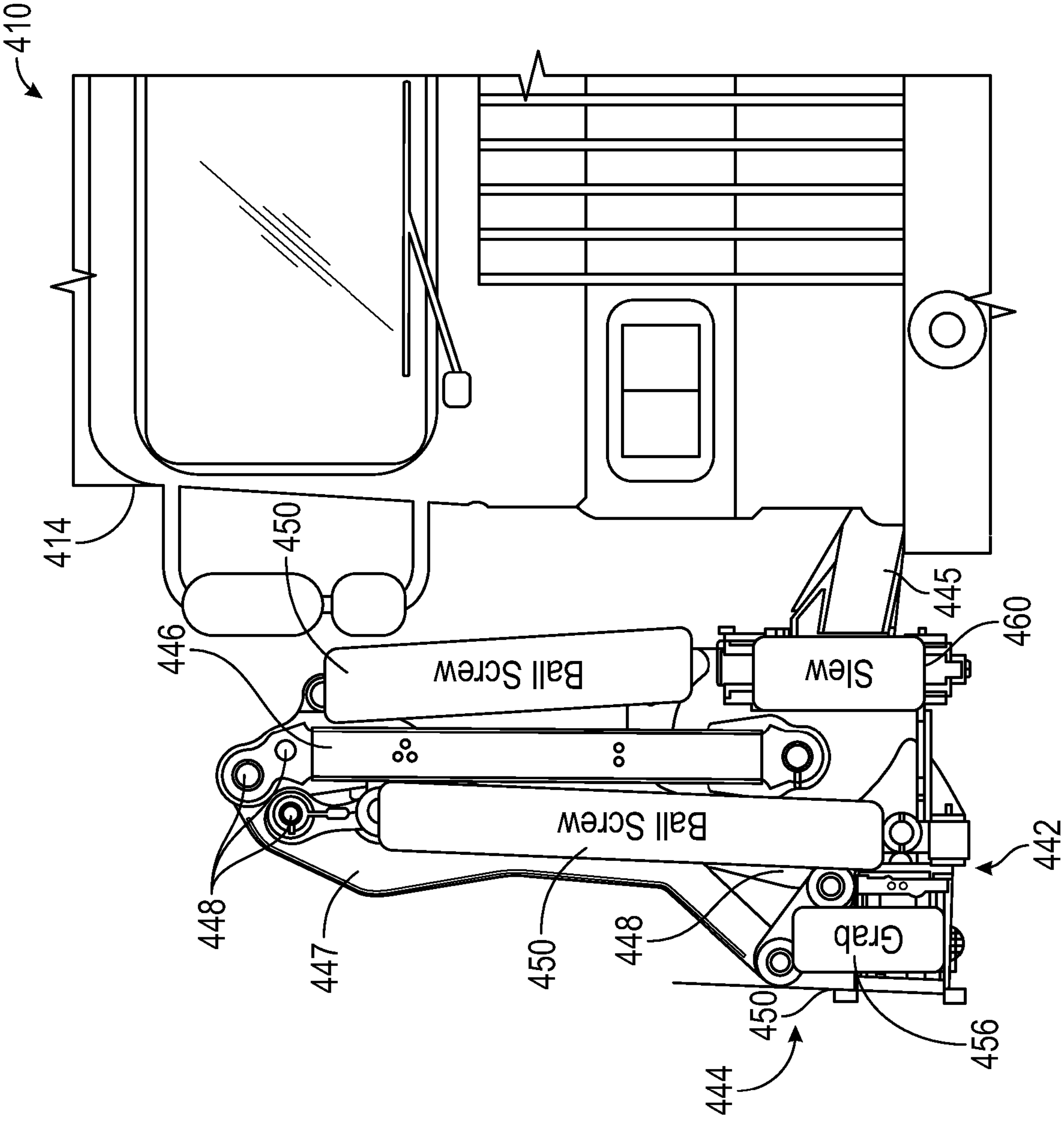
FIG. 11 is a front view of another refuse vehicle having another automated reach arm, according to an exemplary embodiment.

Referring now to FIGS. 11-17, a variety of lift assemblies are shown that may be incorporated into any suitable refuse vehicle (e.g., refuse vehicle 10, refuse vehicle 210, refuse vehicle 310). For example, as shown in FIG. 11, a refuse vehicle 410 having a side-loading lift assembly, shown as automated reach arm 442, is shown, according to an exemplary embodiment. The automated reach arm 442 is similarly coupled to and extends from the side of a body 414 of the refuse vehicle 410. The automated reach arm 442 is actuatable between an extended position (similar to the extended position of the automated reach arm 242 shown in FIG. 3), a retracted position (shown in FIG. 11), and a refuse-dumping position (similar to the refuse-dumping position of the automated reach arm 242 shown in FIG. 6).

The automated reach arm 442 includes a grabber mechanism 444, a body coupling arm 445, a first articulating arm segment 446, a second articulating arm segment 447, and a grabber mechanism leveling arm 448 connected by various joints 448. The automated reach arm 442 further includes a plurality of linear arm actuators 450 coupled to various locations on the plurality of articulating arm segments 445, 446, 447. In some embodiments, the plurality of linear arm actuators 450 are electrically-driven ball screw actuators powered by an on-board power source (e.g., the battery system 20). The plurality of linear arm actuators 450 are further arranged between various articulating arm segments 445, 446, 447 to provide selective actuation of the automated reach arm 442 between the extended position and the retracted position.

The grabber mechanism 444 includes grabber fingers (similar to grabber fingers 252) rotatably coupled to a central attachment portion 454. The central attachment portion further includes a bumper plate (similar to bumper plate 255). The grabber mechanism 444 further includes a grabber motor 456. The grabber motor 456 is configured to selectively actuate the grabber fingers between an opened or receiving position (similar to the grabber fingers 252 shown in FIG. 2) and a closed or grasping position (similar to the grabber fingers 252 shown in FIGS. 3-5). In some embodiments, the grabber motor 456 is an electrically-driven motor powered by an on-board power source (e.g., the battery system 20).

As shown in FIG. 11, in some embodiments, the automated reach arm 442 further includes a slew motor 460 configured to selectively swing the automated reach arm 442 laterally (or side-to-side), with respect to the ground. In some embodiments, the slew motor 460 is an electrically-driven motor powered by an on-board power source (e.g., the battery system 20).

Each of the various linear arm actuators 450, the grabber motor 456, and the slew motor 460 may further be in communication with a controller configured to allow an operator to selectively control actuation of the linear arm actuators 450, the grabber motor 456, and the slew motor 460. As such, the automated reach arm 442 may be operated in a similar manner to the automated reach arm 242, discussed above.

Figure 12:
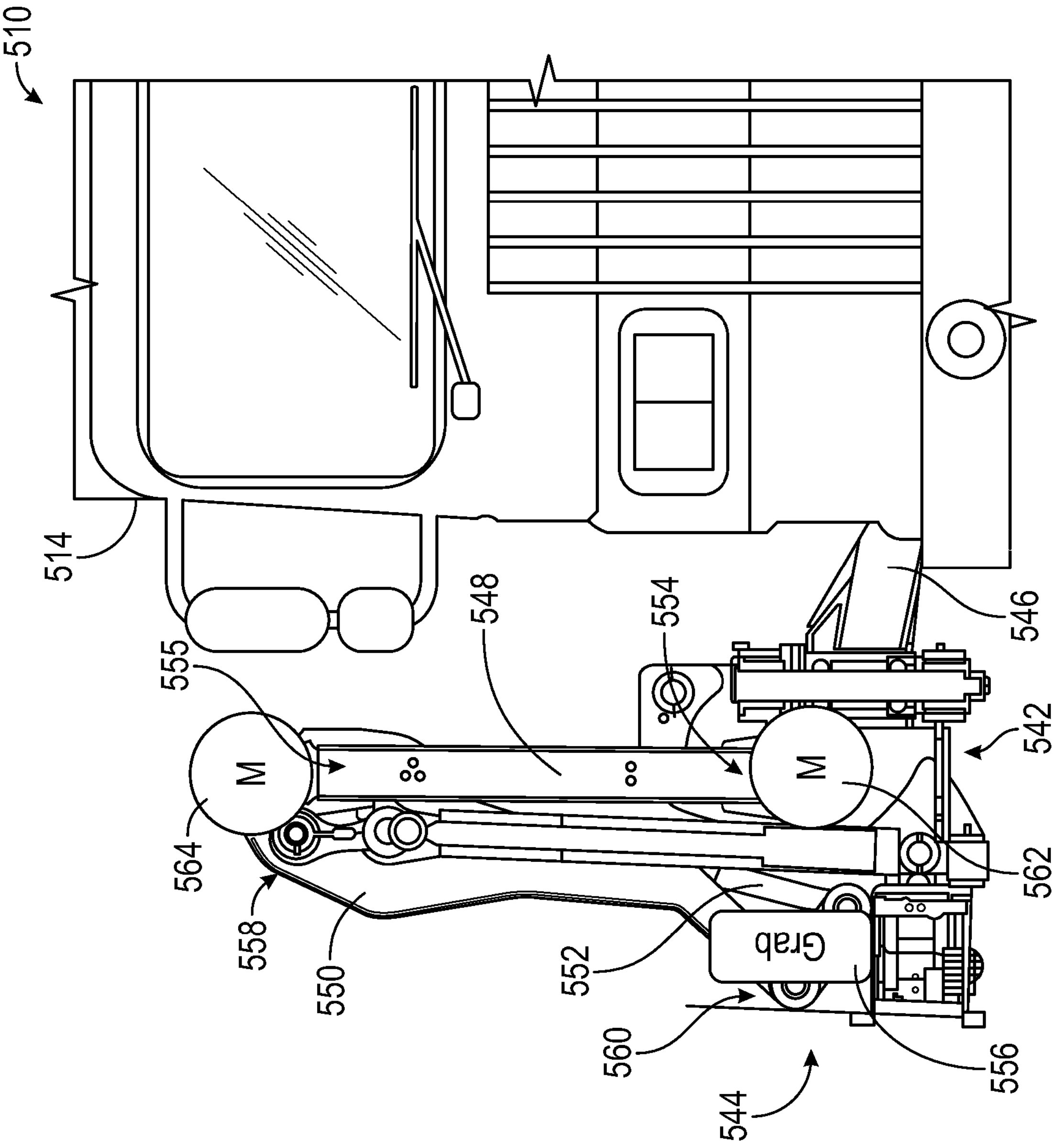
FIG. 12 is a front view of another refuse vehicle having another automated reach arm, according to an exemplary embodiment.

Referring now to FIG. 12, another refuse vehicle 510 having a side-loading lift assembly, shown as automated reach arm 542, is shown, according to an exemplary embodiment. The automated reach arm 542 is similarly coupled to and extends from the side of a body 514 of the refuse vehicle 510. The automated reach arm 542 is similarly actuatable between an extended position (similar to the extended position of the automated reach arm 242 shown in FIG. 3), a retracted position (shown in FIG. 12), and a refuse-dumping position (similar to the refuse-dumping position of the automated reach arm 242 shown in FIG. 6).

The automated reach arm 542 includes a grabber mechanism 544, a body coupling arm 546, a first articulating arm segment 548, a second articulating arm segment 550, and a grabber mechanism leveling arm 552. Specifically, a first end 554 of the first articulating arm segment 548 is hingedly coupled to the body coupling arm 546. A second end 555 of the first articulating arm segment 548 is hingedly coupled to a first end 558 of the second articulating arm segment 550. A second end 560 of the second articulating arm segment 550 is hingedly coupled to the grabber mechanism 544. Similar to the grabber mechanism leveling arm segment 247 of the automated reach arm 242, the grabber mechanism leveling arm 552 is arranged and configured to ensure that the grabber mechanism 544 remains level as the automated reach arm 542 is moved between the retracted position and the extended position.

However, the automated reach arm 542 does not include a plurality of linear arm actuators configured to selectively actuate the automated reach arm 542 between the extended position and the retracted position. Instead, the automated reach arm 542 includes a first articulation motor 562 and a second articulation motor 564. The first articulation motor 562 is disposed proximate the first end 554 of the first articulating arm segment 548. The first articulation motor 562 is configured to selectively rotate the first articulating arm segment 548 about the first end 554 of the first articulating arm segment 548, such that the second end 555 of the first articulating arm segment 548 is selectively rotated toward or away from the side of the body 514 of the refuse vehicle 510 and toward or away from the ground. The second articulation motor 564 is disposed proximate both the second end 555 of the first articulating arm segment 548 and the first end 558 of the second articulating arm segment 550. The second articulation motor 564 is configured to selectively rotate the second articulating arm segment 550 about the first end 558 of the second articulating arm segment 550, such that the second articulating arm segment 550 is selectively rotated toward or away from the first articulating arm segment 548.

Accordingly, the first articulation motor 562 and the second articulation motor 564 are collectively configured to selectively actuate the automated reach arm 542 between the extended position and the retracted position. In some embodiments, each of the first articulation motor 562 and the second articulation motor 564 are powered by an on-board power source (e.g., the battery system 20).

The grabber mechanism 544 is substantially similar to the grabber mechanism 444 and similarly includes a grabber motor 556 configured to selectively actuate grabber fingers (similar to the grabber fingers 252) between an opened or receiving position (similar to the grabber fingers 252 shown in FIG. 2) and a closed or grasping position (similar to the grabber fingers 252 shown in FIGS. 3-5). In some embodiments, the grabber motor 556 is similarly an electrically-driven motor powered by an on-board power source (e.g., the battery system 20).

Each of the first articulation motor 562, the second articulation motor 564, and the grabber motor 556 may further be in communication with a controller configured to allow an operator to selectively control actuation of the first articulation motor 562, the second articulation motor 564, and the grabber motor 556. As such, the automated reach arm 542 may be operated in a similar manner to the automated reach arm 242, discussed above.

Figure 13:
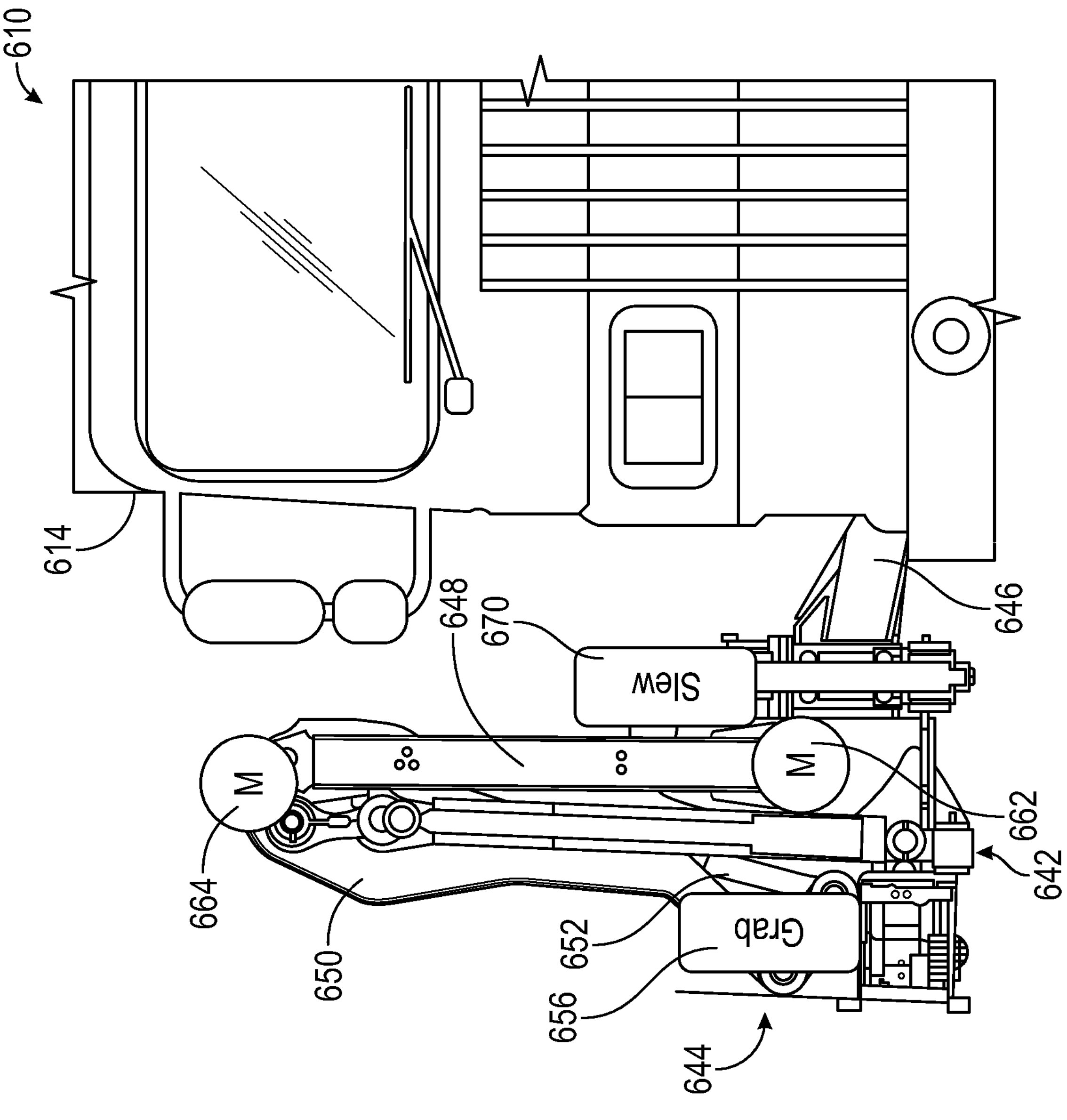
FIG. 13 is a front view of another refuse vehicle having another automated reach arm, according to an exemplary embodiment.

Referring now to FIG. 13, another refuse vehicle 610 having a side-loading lift assembly, shown as automated reach arm 642, is shown, according to an exemplary embodiment. The automated reach arm 642 is substantially similar to the automated reach arm 542 discussed above, with reference to FIG. 12. For example, the automated reach arm 642 is similarly coupled to and extends from the side of a body 614 of the refuse vehicle 610 and is actuatable between an extended position (similar to the extended position of the automated reach arm 242 shown in FIG. 3), a retracted position (shown in FIG. 13), and a refuse-dumping position (similar to the refuse-dumping position of the automated reach arm 242 shown in FIG. 6).

The automated reach arm 642 similarly includes a grabber mechanism 644, a body coupling arm 646, a first articulating arm segment 648, a second articulating arm segment 650, a grabber mechanism leveling arm 652, a first articulation motor 662 and a second articulation motor 664. The various components of the automated reach arm 642 are arranged and configured to operate substantially similarly to the corresponding components of the automated reach arm 542 described above. Accordingly, the following description will focus on the differences between the automated reach arm 642 and the automated reach arm 542.

Specifically, the automated reach arm 642 further includes a slew motor 670, similar to the slew motor 460 of the automated reach arm 442, described above. The slew motor 670 is coupled between the body coupling arm 646 and the first articulating arm segment 648 and is similarly configured to selectively swing the automated reach arm 642 laterally (or side-to-side), with respect to the ground. In some embodiments, the slew motor 670 is an electrically-driven motor powered by an on-board power source (e.g., the battery system 20).

The grabber mechanism 644 similarly includes a grabber motor 656 configured to selectively actuate grabber fingers (similar to the grabber fingers 252) between an opened or receiving position (similar to the grabber fingers 252 shown in FIG. 2) and a closed or grasping position (similar to the grabber fingers 252 shown in FIGS. 3-5). In some embodiments, the grabber motor 656 is similarly an electrically-driven motor powered by an on-board power source (e.g., the battery system 20).

Each of the first articulation motor 662, the second articulation motor 664, the grabber motor 656, and the slew motor 670 may further be in communication with a controller configured to allow an operator to selectively control actuation of the first articulation motor 662, the second articulation motor 664, the grabber motor 656, and the slew motor 670. As such, the automated reach arm 642 may be operated in a similar manner to the automated reach arm 242, discussed above.

Figure 14:
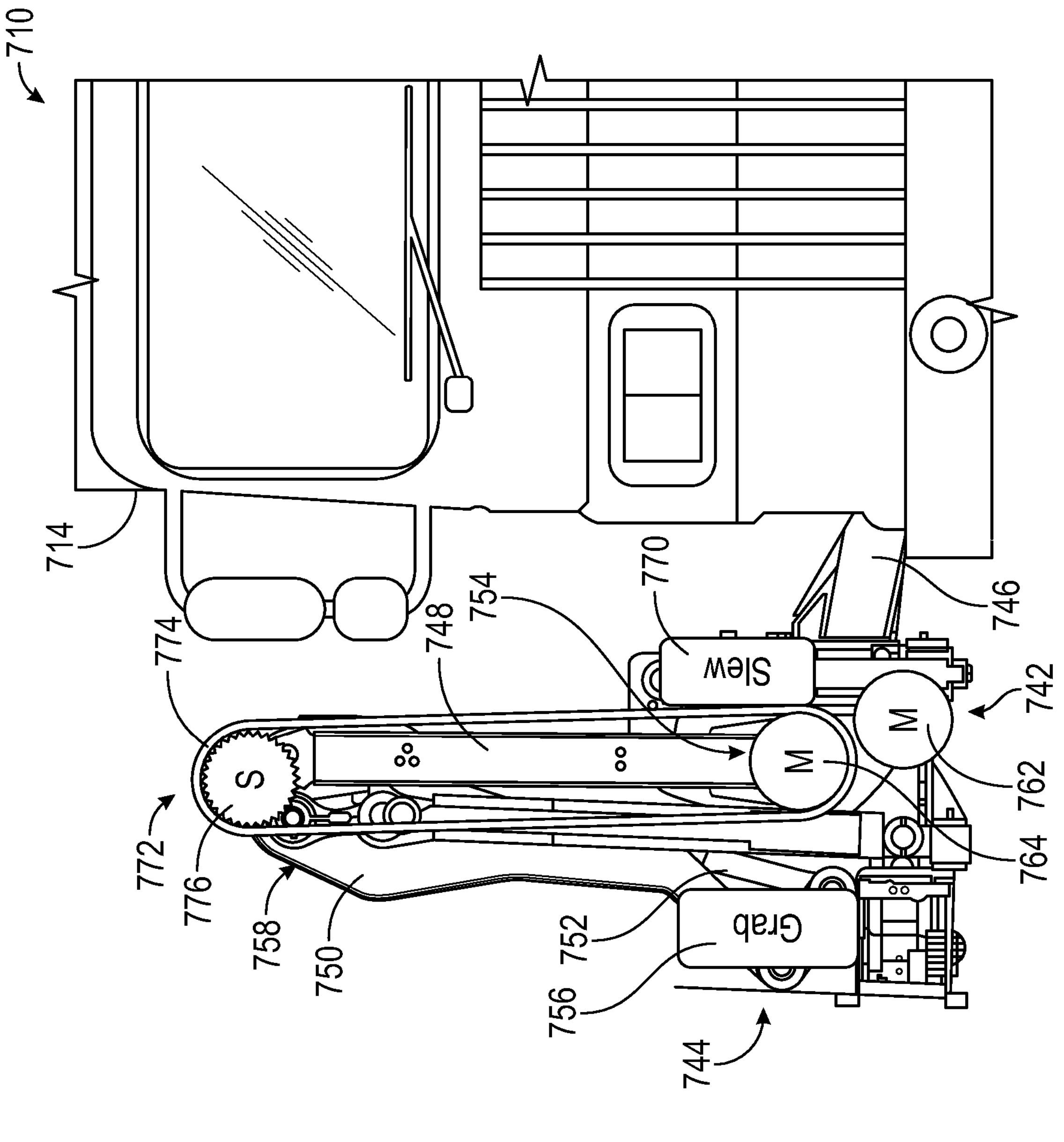
FIG. 14 is a front view of another refuse vehicle having another automated reach arm, according to an exemplary embodiment.

Referring now to FIG. 14, another refuse vehicle 710 having a side-loading lift assembly, shown as automated reach arm 742, is shown, according to an exemplary embodiment. The automated reach arm 742 is substantially similar to the automated reach arm 642 discussed above, with reference to FIG. 13. For example, the automated reach arm 742 is coupled to and extends from the side of a body 714 of the refuse vehicle 710 and is actuatable between an extended position (similar to the extended position of the automated reach arm 242 shown in FIG. 3), a retracted position (shown in FIG. 14), and a refuse-dumping position (similar to the refuse-dumping position of the automated reach arm 242 shown in FIG. 6).

The automated reach arm 742 similarly includes a grabber mechanism 744, a body coupling arm 746, a first articulating arm segment 748, a second articulating arm segment 750, a grabber mechanism leveling arm 752, a grabber motor 756, a first articulation motor 762, a second articulation motor 764, and a slew motor 770. The various components of the automated reach arm 742 are arranged and configured to operate substantially similarly to the corresponding components of the automated reach arm 642 described above. Accordingly, the following description will focus on the differences between the automated reach arm 742 and the automated reach arm 642.

Specifically, both the first articulation motor 762 and the second articulation motor 764 are disposed proximate a first end 754 of the first articulating arm segment 748. The first articulation motor 762 functions similarly to the first articulation motor 662 and the first articulation motor 762 to rotate the first articulating arm segment 748 about the first end 754 of the first articulating arm segment 748. The second articulation motor 764 is similarly configured to rotate the second articulating arm segment 750 about a first end 758 of the second articulating arm segment 750, but is configured to do so through a chain and sprocket assembly 772.

For example, the chain and sprocket assembly 772 includes a chain 774 and a sprocket 776. The chain 774 is configured to be selectively driven by the second articulation motor 764. The chain 774 is further engaged with the sprocket 776, such that when the chain 774 is driven by the second articulation motor 764, the chain 774 causes the sprocket 776 to rotate. The sprocket 776 is rotatably engaged with the first end 758 of the second articulating arm segment 750, such that rotation of the sprocket 776 results in rotation of the second articulating arm segment 750 about the first end 758 of the second articulating arm segment 750. Accordingly, the second articulation motor 764 is configured to selectively rotate the second articulating arm segment 750 via the chain and sprocket assembly 772.

By having the second articulation motor 764 disposed proximate the first end 754 of the first articulating arm segment 748, the second articulation motor 764 may be maintained in a stationary or substantially stationary position during operation, thereby reducing maintenance associated with wiring a moving electrically-driven motor. Furthermore, by having the second articulation motor 764 disposed proximate the first end 754 of the first articulating arm segment 748, a moment of force imparted on the body coupling arm 746 (and/or the body 714 of the refuse vehicle 710) by the automated reach arm 742 in the extended position may be reduced.

Each of the grabber motor 756, the first articulation motor 762, the second articulation motor 764, and the slew motor 770 may further be in communication with a controller configured to allow an operator to selectively control actuation of the grabber motor 756, the first articulation motor 762, the second articulation motor 764, and the slew motor 770. As such, the automated reach arm 742 may be operated in a similar manner to the automated reach arm 242, discussed above.

Figure 15:
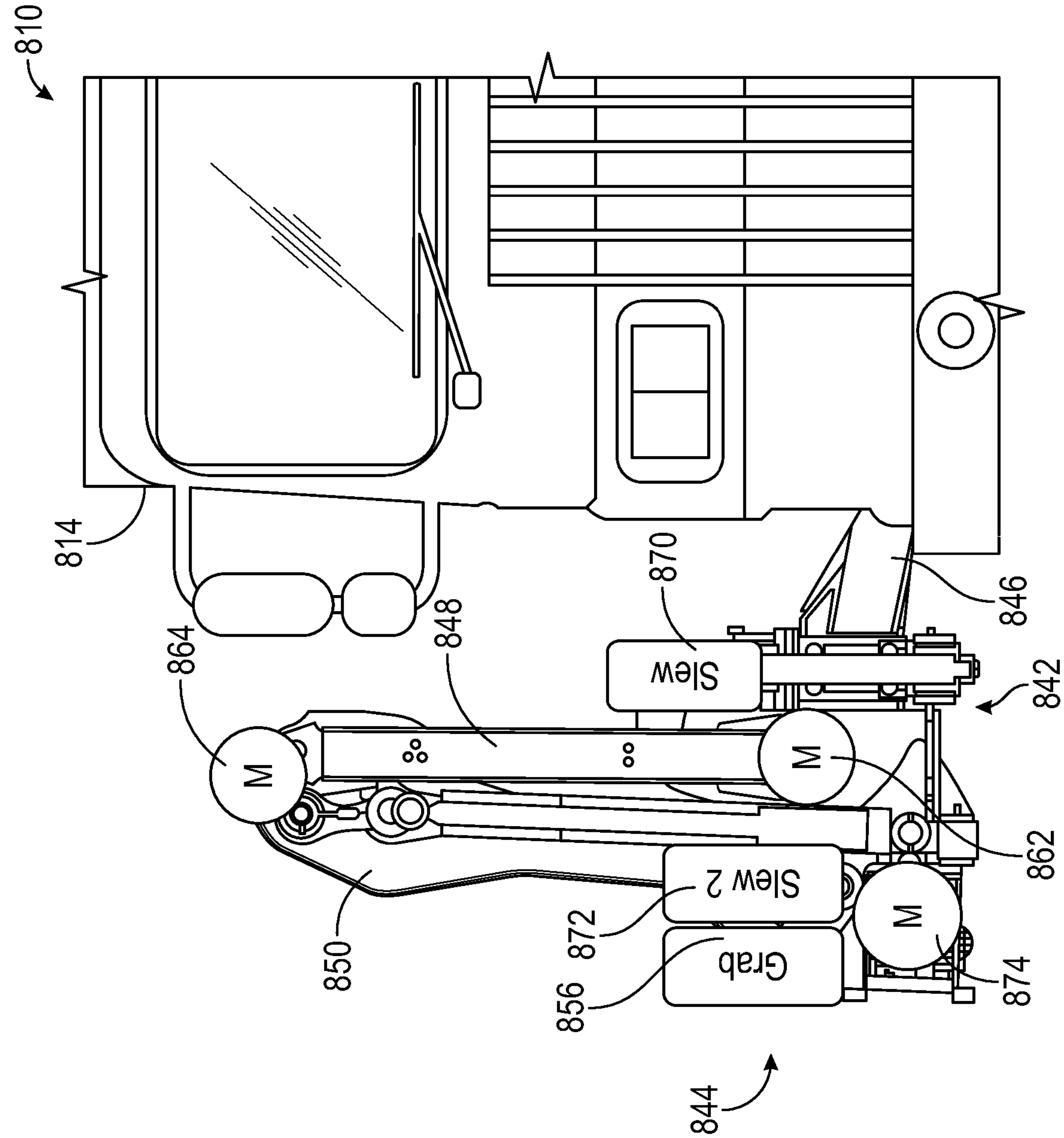
FIG. 15 is a front view of another refuse vehicle having another automated reach arm, according to an exemplary embodiment.
Figure 16:
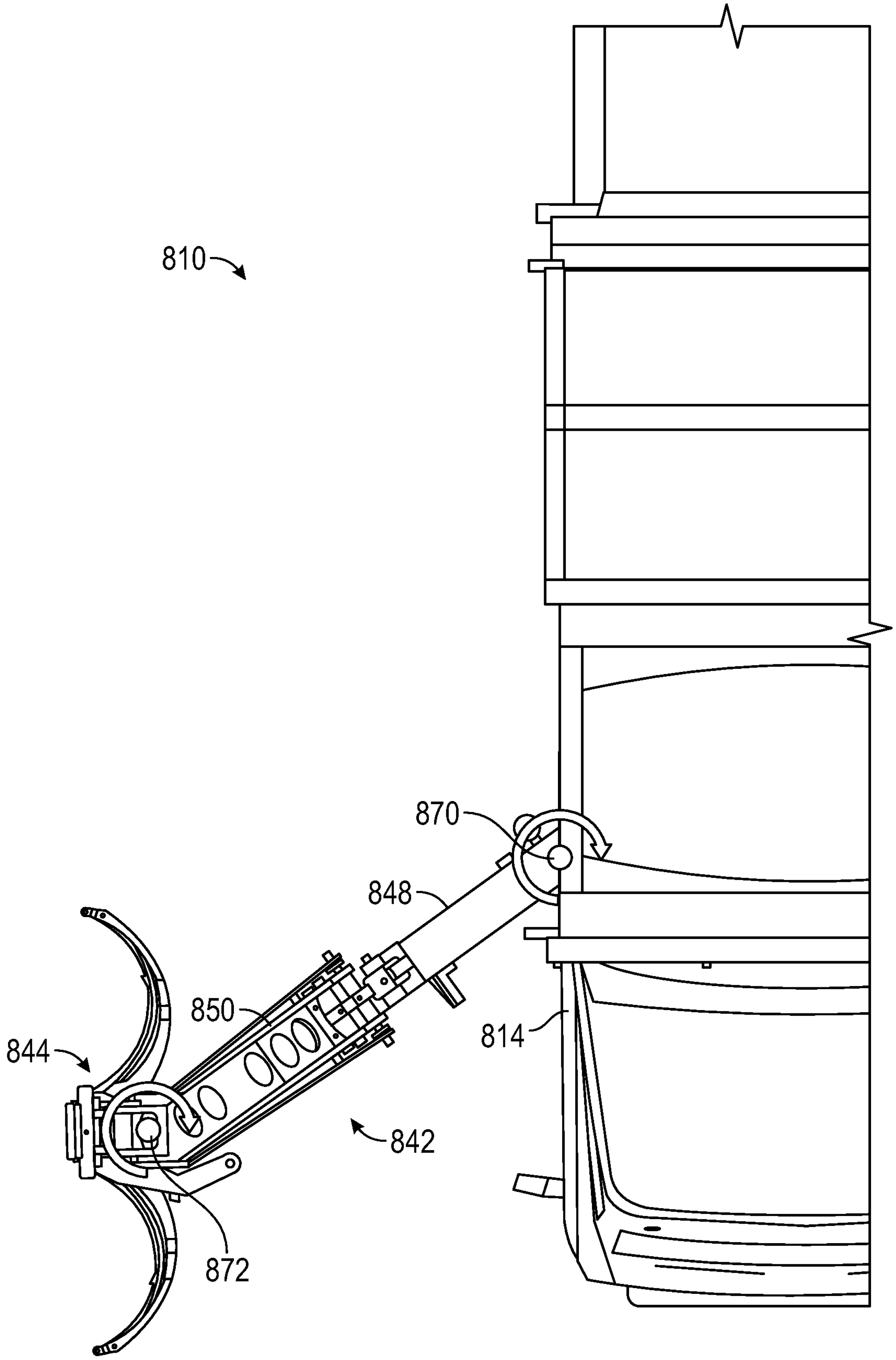
FIG. 16 is a top plan view of the refuse vehicle of FIG. 15, according to an exemplary embodiment.
Figure 17:
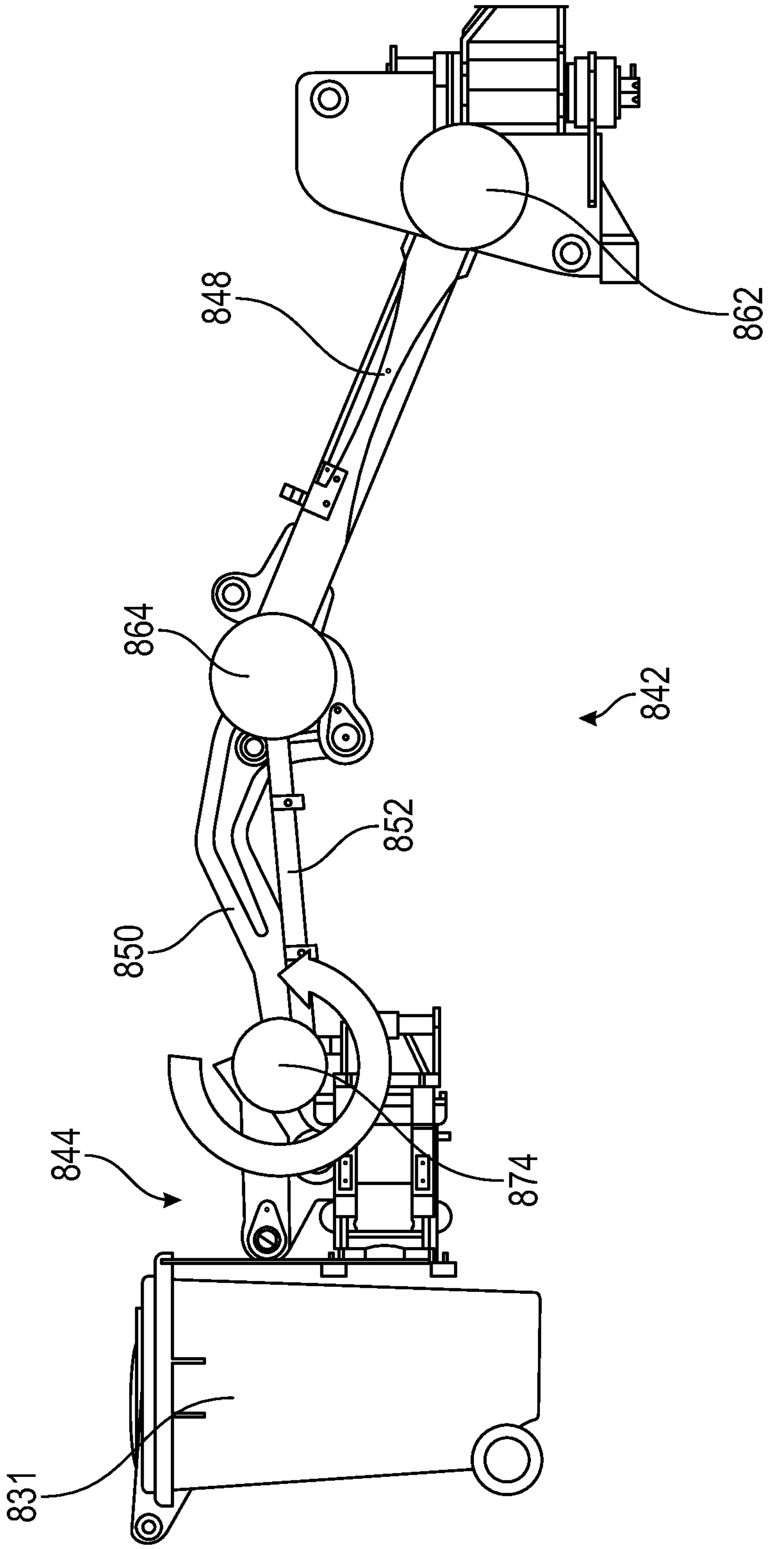
FIG. 17 is a front view of the automated reach arm of FIG. 15, shown in an extended position, according to an exemplary embodiment.

Referring now to FIGS. 15-17, another refuse vehicle 810 having a side-loading lift assembly, shown as automated reach arm 842, is shown, according to an exemplary embodiment. The automated reach arm 842 is substantially similar to the automated reach arm 642 discussed above, with reference to FIG. 13. For example, the automated reach arm 842 is coupled to and extends from the side of a body 814 of the refuse vehicle 810 and is actuatable between an extended position (shown in FIGS. 16 and 17), a retracted position (shown in FIG. 15), and a refuse-dumping position (similar to the refuse-dumping position of the automated reach arm 242 shown in FIG. 6).

The automated reach arm 842 similarly includes a grabber mechanism 844, a body coupling arm 846, a first articulating arm segment 848, a second articulating arm segment 850, a grabber mechanism leveling arm 852 (shown in FIG. 17), a grabber motor 856, a first articulation motor 862, a second articulation motor 864, and a first slew motor 870. The various components of the automated reach arm 842 are arranged and configured to operate substantially similarly to the corresponding components of the automated reach arm 642 described above. Accordingly, the following description will focus on the differences between the automated reach arm 842 and the automated reach arm 642.

Specifically, the automated reach arm 842 further includes a second slew motor 872 and a grabber mechanism tilt motor 874. The first slew motor 870 is substantially similar to the slew motor 670 discussed above. For example, the first slew motor 870 is coupled between the body coupling arm 846 and the first articulating arm segment and is similarly configured to selectively swing the entire automated reach arm 842 (e.g., including the first articulating arm segment 848 and the second articulating arm segment 850) laterally (or side-to-side), with respect to the ground (as shown in FIG. 16). The second slew motor 872 is similar to the first slew motor 870, but is coupled between the second articulating arm segment 850 and the grabber mechanism 844. Accordingly, the second slew motor 872 is configured to swing the grabber mechanism 844 laterally (or side-to-side), with respect to the ground (as shown in FIG. 16). The grabber mechanism tilt motor 874 is similarly coupled between the second articulating arm segment 850 and the grabber mechanism 844 (e.g., between the second slew motor 872 and the grabber mechanism 844 or between the second slew motor 872 and the second articulating arm segment 850). The grabber mechanism tilt motor 874 is configured to selectively tilt the grabber mechanism 844 vertically (or up-and-down), with respect to the ground (as shown in FIG. 17).

Accordingly, the first slew motor 870, the second slew motor 872, and the grabber mechanism tilt motor 874 may allow for the automated reach arm 842 to better align the grabber mechanism 844 with a refuse container 831 (shown in FIG. 17). For example, the first slew motor 870 may allow for the automated reach arm 842 to be aligned with the refuse container when it is arranged in front of (closer to a front end of the refuse vehicle 810) or behind (closer to a rear end of the refuse vehicle 810) the location where the automated reach arm 842 is coupled to the body 814 of the refuse vehicle 810. The second slew motor 872 may allow for the grabber mechanism 844 to be aligned or squared to the refuse container 831 when the refuse container 831 is twisted or turned at an angle from the grabber mechanism 844 to ensure that a bumper plate (similar to bumper plate 255) is squared to a surface of the refuse container 831 prior to moving the grabber mechanism 844 into the closed or grasping position to engage the refuse container 831. Similarly, the grabber mechanism tilt motor 874 may allow for the automated reach arm 842 to better align the grabber mechanism 844 with the refuse container 831 when the refuse container is on a grade or a different vertical level than the refuse vehicle 810.

Each of the grabber motor 856, the first articulation motor 862, the second articulation motor 864, the first slew motor 870, the second slew motor 872, and the grabber mechanism tilt motor 874 may further be in communication with a controller configured to allow an operator to selectively control actuation of the grabber motor 856, the first articulation motor 862, the second articulation motor 864, the first slew motor 870, the second slew motor 872, and the grabber mechanism tilt motor 874. As such, the automated reach arm 842 may be operated in a similar manner to the automated reach arm 242, discussed above. Further, the automated reach arm 842 may provide six degrees of freedom (e.g., via independent actuation of each of the six different motors 856, 862, 864, 870, 872, 874), as will be described below, thereby allowing for additional improvement in the alignment between the grabber mechanism 844 and the refuse container 831 during operation.

For example, the automated reach arm 842 is configured to extend in a first direction from the retracted position to the extended position (e.g., in a direction normal to a side of the body 814). The first articulating arm segment 848 is configured to rotate with respect to the second articulating arm segment 850 about a first axis (e.g., about the hinged connection between the first articulating arm segment 848 and the second articulating arm segment 850). The first axis is perpendicular to the first direction (e.g., the first axis extends directly into/out of the page, with respect to the illustrative example provided in FIG. 15).

The first articulation motor 862 is configured to selectively rotate the first articulating arm segment 848 with respect to the body 814 about a second axis (e.g., about the hinged connection between the first articulating arm segment 848 and the body 814. The second axis is parallel to the first axis. The second articulation motor 864 is configured to selectively rotate the second articulating arm segment 850 with respect to the first articulating arm segment 848 about the first axis. The first slew motor 870 is configured to selectively swing the automated reach arm 842 with respect to the body 814 about a third axis that is perpendicular to both the first direction and the first axis (e.g., about the center of the first slew motor 870, as shown in FIG. 16). The grabber mechanism tilt motor 874 is configured to selectively tilt the grabber mechanism 844 with respect to the second articulating arm segment 850 about a fifth axis, parallel to the first axis and the second axis (e.g., an axis located at the center of the grabber mechanism tilt motor 874 and extending into/out of the page, with respect to the illustrative embodiment provided in FIG. 15).

Figure 18:
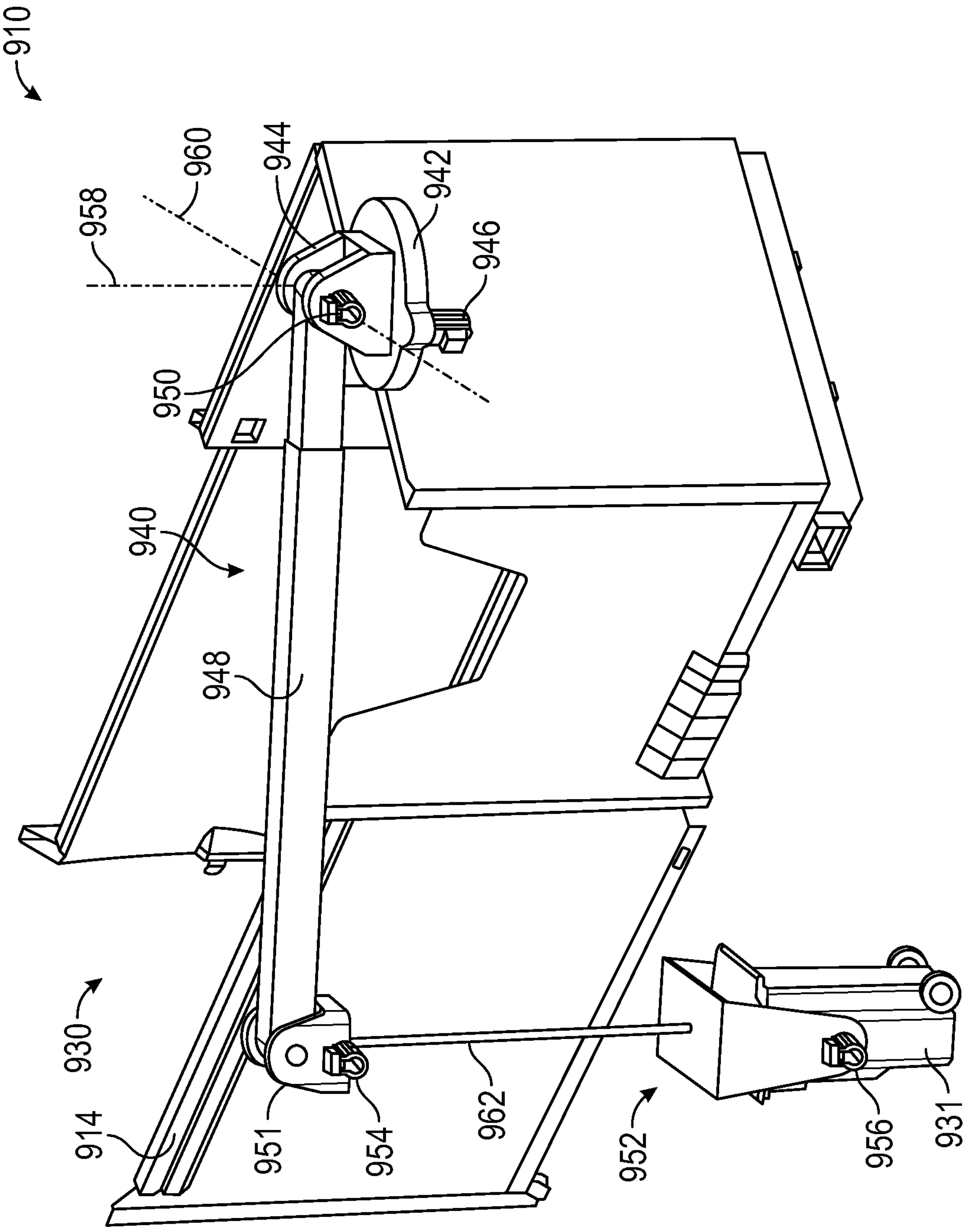
FIG. 18 is a perspective view of another refuse vehicle having a crane lift assembly, according to an exemplary embodiment.

Referring now to FIG. 18, a refuse vehicle 910 is shown, according to an exemplary embodiment. The refuse vehicle 910 similarly includes a body assembly, shown as body 914. The body 914 similarly includes a collection chamber (e.g., hopper, etc.), shown as refuse compartment 930. According to an exemplary embodiment, the refuse compartment 930 is configured to receive refuse from a refuse container 931.

The refuse vehicle 910 includes a side-loading lift assembly, shown as a crane lift assembly 940. As shown in FIG. 18, the crane lift assembly 940 is coupled to and extends from an upper end of a front of the body 914. The crane lift assembly 940 is configured to engage the refuse container 931.

As will be described below, the crane lift assembly 940 includes various electrically driven actuators and/or motors to facilitate manipulation of the refuse container 931. For example, the various electrically-driven actuators and/or motors of the crane lift assembly 940 allow for the crane lift assembly 940 to engage the refuse container 931, lift the refuse container 931, tip refuse out of the refuse container 931 into the hopper volume of the refuse compartment 930, and return the empty refuse container 931 to the ground.

As shown in FIG. 18, in an exemplary embodiment, the crane lift assembly 940 includes a crane platform 942, a crane platform hinge 944, a crane platform motor 946, a crane arm 948, a crane platform hinge motor 950, a crane arm hinge 951, a refuse container engagement mechanism 952, a refuse container lift motor 954, and a refuse container tip motor 956. The crane platform 942 is coupled to and extends from the upper portion of the front of the body 914. The crane platform hinge 944 is rotatably coupled to the crane platform 942, such that the crane platform hinge 944 may rotate about a vertical axis 958 (with respect to the ground) extending through the crane platform 942. The crane platform motor 946 is configured to selectively rotate the crane platform hinge 944 about the vertical axis 958.

The crane arm 948 is hingedly coupled to the crane platform hinge 944. The crane arm 948 may further comprise a telescoping crane arm that is selectively extendable or retractable using an internal linear actuator disposed within the crane arm 948. In some embodiments, the internal linear actuator is an electrically-driven linear actuator that is powered by an on-board energy source (e.g., the battery system 20). The crane platform hinge motor 950 is configured to selectively rotate the crane arm 948 about a crane platform hinge axis 960 defined by the rotational axis of the crane platform hinge 944.

The crane arm hinge 951 is hingedly coupled to the crane arm 948 at an opposite end of the crane arm 948 from the crane platform hinge 944. The crane arm hinge 951 is further coupled to the refuse container engagement mechanism 952 via a connection cable 962. The refuse container engagement mechanism 952 is coupled to the connection cable 962 at an opposite end of the connection cable 962 from the crane arm hinge 951. The refuse container engagement mechanism 952 is further configured to engage the refuse container 931 (e.g., via a hook connect, a selective latching mechanism, an electromagnetic latching force) to grab or pick up the refuse container 931.

The refuse container lift motor 954 is configured to selectively raise and lower the refuse container engagement mechanism 952. For example, the refuse container lift motor 954 may be rotatably coupled to a cable spool configured to selectively retract and let out the connection cable 962 to selectively raise and lower the refuse container engagement mechanism 952. The refuse container tip motor 956 may be configured to, while the refuse container engagement mechanism 952 is engaged with the refuse container 931, selectively tip the refuse container 931 to tip the contents (e.g., refuse, waste) into the refuse compartment 930 of the refuse vehicle 910.

The crane platform motor 946, the crane platform hinge motor 950, the refuse container lift motor 954, and the refuse container tip motor 956 may each be in communication with a controller configured to allow an operator to selectively actuate each of the crane platform motor 946, the crane platform hinge motor 950, the refuse container lift motor 954, and the refuse container tip motor 956 during operation. Using the various motors 946, 950, 956, 956 of the crane lift assembly 940, the operator may effectively engage the refuse container 931 using the refuse container engagement mechanism 952, lift the refuse container 931 using the refuse container lift motor 954, carry the refuse container 931 into a refuse dump position proximate the refuse compartment 930 using the various motors and/or the internal linear actuator of the crane arm 948, and tip the refuse container 931 to pour the contents of the refuse container 931 into the refuse compartment 930 of the refuse vehicle 910. The operator may then similarly return the refuse container 931 to its original orientation and location in a similar manner.

Further, the crane lift assembly 940 may be configured to selectively engage refuse containers (similar to the refuse container 931) on both lateral sides of the refuse vehicle 910. For example, the crane platform motor 946 may be configured to selectively rotate the crane platform hinge 944 (and thereby the remainder of the crane lift assembly 940) fully around (e.g., 360 degrees about the vertical axis 958), such that the crane arm 948 can extend in either lateral direction, with respect to the refuse vehicle 910.

Additionally, in some instances, as illustrated in FIG. 18, the refuse compartment 930 of the refuse vehicle 910 may have an open top, such that the refuse container 931 can be dumped into the refuse compartment 930 at any location along the length of the refuse compartment 930.

Furthermore, by using the crane lift assembly 940, the crane arm 948 can be extended over an intervening object disposed between the refuse vehicle 910 and the refuse container 931, the refuse container engagement mechanism 952 can then be lowered down and engaged with the refuse container 931, and then the refuse container engagement mechanism 952 can be used to lift the refuse container 931 up and over the intervening object to dump the refuse container 931 into the refuse compartment 930 of the refuse vehicle 910.

Figure 19:
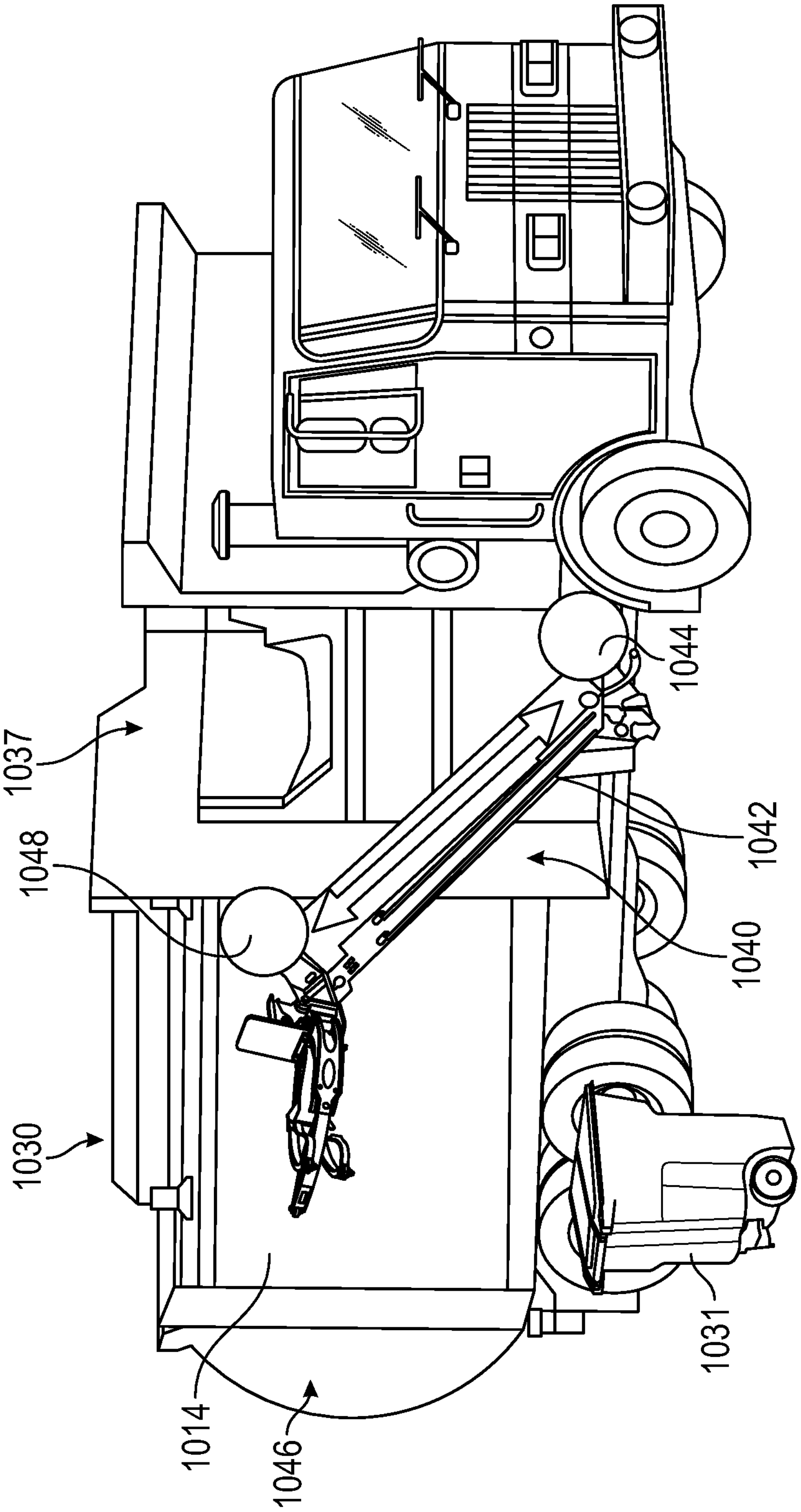
FIG. 19 is a perspective view of another refuse vehicle having a telescoping lift assembly, according to an exemplary embodiment.

Referring now to FIG. 19, a refuse vehicle 1010 is shown, according to an exemplary embodiment. The refuse vehicle 1010 similarly includes a body assembly, shown as body 1014. The body 1014 similarly includes a collection chamber (e.g., hopper, etc.), shown as refuse compartment 1030. According to an exemplary embodiment, the refuse compartment 1030 further includes an opening 1037 configured to receive refuse from a refuse container 1031.

The refuse vehicle 1010 includes a lift mechanism/system, shown as a telescoping lift assembly 1040. As shown in FIG. 19, the telescoping lift assembly 1040 is coupled to and extends from a lateral side of the body 1014. The telescoping lift assembly 1040 is configured to engage the refuse container 1031.

As will be described below, the telescoping lift assembly 1040 includes various electrically driven actuators and/or motors to facilitate manipulation of the refuse container 1031. For example, the various electrically-driven actuators and/or motors of the telescoping lift assembly 1040 may be in communication with a controller configured to allow for a user of the telescoping lift assembly 1040 to selectively engage the refuse container 1031, lift the refuse container 1031, tip refuse out of the refuse container 1031 into the hopper volume of the refuse compartment 1030 through the opening 1037, and return the empty refuse container 1031 to the ground.

As shown in FIG. 19, in an exemplary embodiment, the telescoping lift assembly 1040 includes a telescoping boom arm 1042, an arm articulating motor 1044, a grabber mechanism 1046, and a grabber mechanism tilt motor 1048. The telescoping boom arm 1042 is hingedly coupled to a lateral side of the body 1014 of the refuse vehicle 1010. The telescoping boom arm 1042 is further selectively extendable (e.g., via an internal electrically-driven linear actuator) between an extended position, a retracted position, and a refuse-dumping position (e.g., when the telescoping boom arm 1042 is retracted and then rotated up to dump the refuse from the refuse container 1031 into the refuse compartment 1030). The arm articulating motor 1044 is configured to selectively rotate the telescoping boom arm 1042 vertically (or up-and-down) with respect to the ground. In some instances, the telescoping lift assembly 1040 may further include a slew motor configured to rotate the telescoping boom arm 1042 laterally (or side-to-side) with respect to the ground (similar to the slew motor 670 discussed above).

The grabber mechanism 1046 is substantially similar to the grabber mechanisms discussed above (e.g., grabber mechanism 444) and may similarly include a grabber motor (similar to the grabber motor 456) configured to selectively actuate grabber fingers (similar to the grabber fingers 252) between an opened or receiving position and a closed or grasping position. The grabber mechanism tilt motor 1048 may be substantially similar to the grabber mechanism tilt motor 874, and may similarly be configured to selectively tilt the grabber mechanism 1046 vertically (or up-and-down), with respect to the ground. Similarly in some instances, the lift assembly may further include a second slew motor configured to swing the grabber mechanism 1046 laterally (or side-to-side), with respect to the ground.

Figure 20:
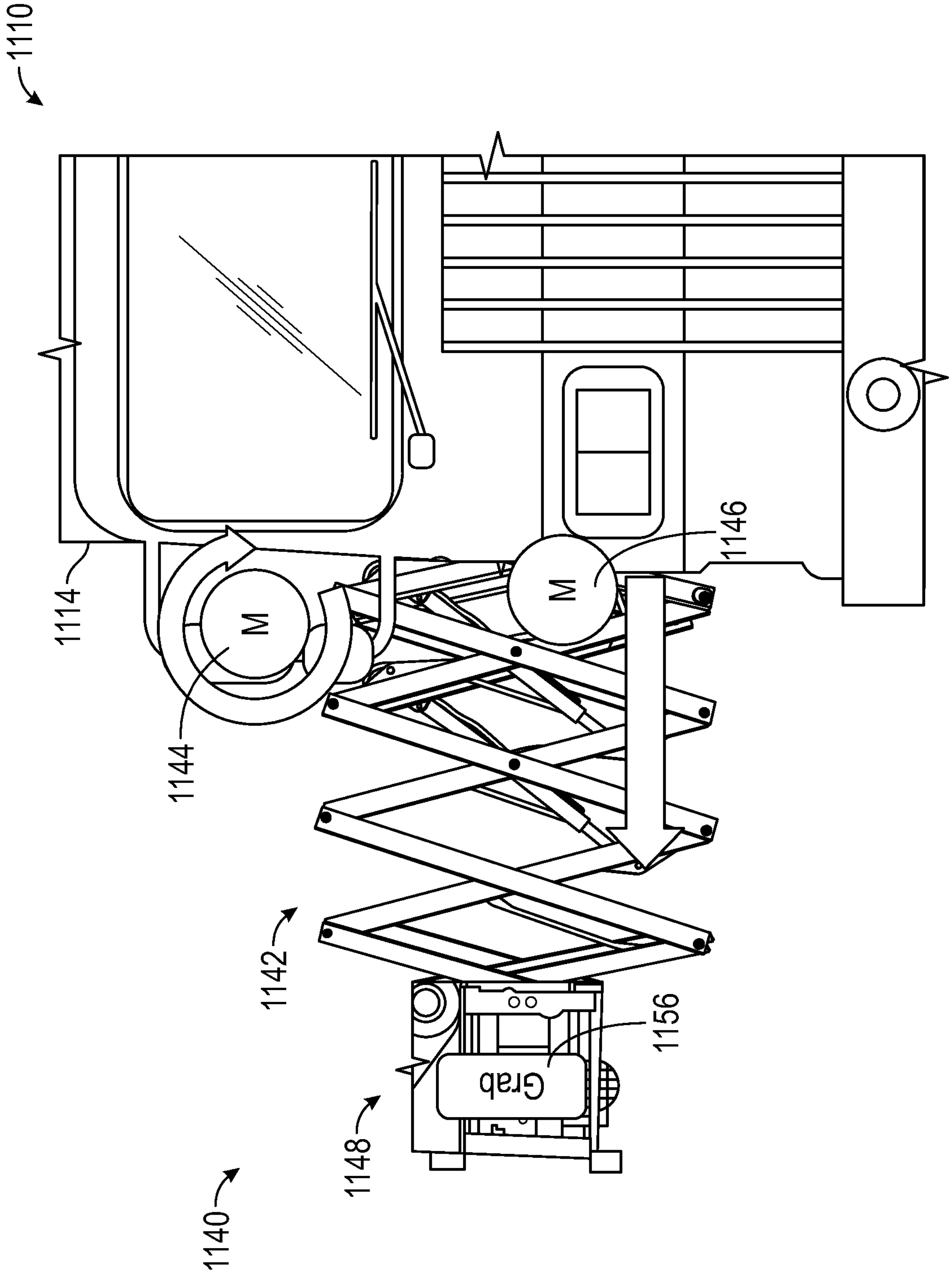
FIG. 20 is a front view of another refuse vehicle having a scissor lift assembly, according to an exemplary embodiment.

Referring now to FIG. 20, a refuse vehicle 1110 is shown, according to an exemplary embodiment. The refuse vehicle 1110 similarly includes a body assembly, shown as body 1114. The refuse vehicle 1110 further includes a lift mechanism/system, shown as a scissor lift assembly 1140. As shown in FIG. 20, the scissor lift assembly 1140 is coupled to and extends from a lateral side of the body 1114. The scissor lift assembly 1140 is similarly configured to engage a refuse container.

As will be described below, the scissor lift assembly 1140 includes various electrically driven actuators and/or motors to facilitate manipulation of the refuse container. For example, the various electrically-driven actuators and/or motors of the scissor lift assembly 1140 may be in communication with a controller configured to allow for a user of the scissor lift assembly 1140 to selectively engage the refuse container, lift the refuse container, tip refuse out of the refuse container into the hopper volume of a refuse compartment of the body 1114, and return the empty refuse container to the ground.

As shown in FIG. 20, in an exemplary embodiment, the scissor lift assembly 1140 includes a scissor extension mechanism 1142, a scissor articulating motor 1144, a scissor actuation motor 1146, and a grabber mechanism 1148. The scissor extension mechanism 1142 is hingedly coupled to a lateral side of the body 1114 of the refuse vehicle 1110. The scissor extension mechanism 1142 is further selectively extendable between an extended position, a retracted position, and a refuse-dumping position (e.g., when the scissor extension mechanism 1142 is retracted and then rotated up to dump the refuse from the refuse container into the refuse compartment of the body 1114). The scissor articulating motor 1144 is configured to selectively rotate the scissor extension mechanism 1142 vertically (or up-and-down) with respect to the ground. In some instances, the scissor lift assembly 1140 may further include a slew motor configured to rotate the scissor extension mechanism 1142 laterally (or side-to-side) with respect to the ground (similar to the slew motor 670 discussed above). The scissor actuation motor 1146 is configured to selectively extend or retract the scissor extension mechanism 1142 (e.g., via a linear actuator or a rack and pinion actuator)

The grabber mechanism 1148 is substantially similar to the grabber mechanisms discussed above (e.g., grabber mechanism 444) and may similarly include a grabber motor 1156 configured to selectively actuate grabber fingers (similar to the grabber fingers 252) between an opened or receiving position and a closed or grasping position. The grabber mechanism 1148 may further include a grabber mechanism tilt motor (similar to the grabber mechanism tilt motor 874) configured to selectively tilt the grabber mechanism 1148 vertically (or up-and-down), with respect to the ground. Similarly in some instances, the lift assembly may further include a second slew motor configured to swing the grabber mechanism 1148 laterally (or side-to-side), with respect to the ground.

Figure 21:
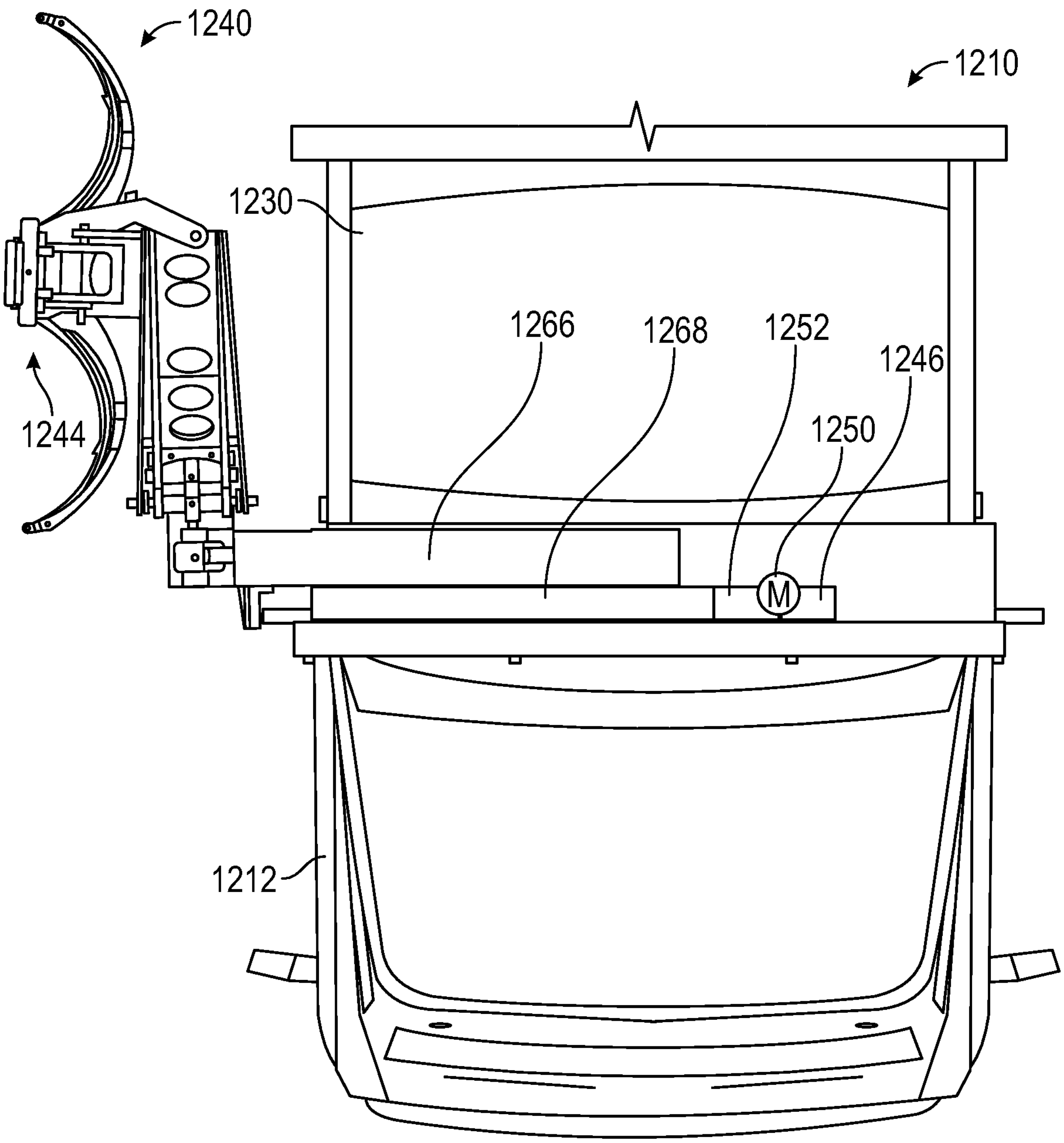
FIG. 21 is a schematic top view of another refuse vehicle having a side loader lift assembly, according to an exemplary embodiment.

Referring now to FIGS. 21-27, a side loader lift assembly 1240 is illustrated, according to an exemplary embodiment. As shown in FIG. 21, the side loader lift assembly 1240 may be coupled to a refuse vehicle 1210 (which may be similar to any of the refuse vehicles discussed herein) between a cab 1212 and a refuse compartment 1230 of the refuse vehicle 1210. The side loader lift assembly 1240 may similar be configured to engage a refuse container 1231 (shown in FIG. 22) to dump the contents thereof into the refuse compartment 1230 of the refuse vehicle 1210.

In some instances, the side loader lift assembly 1240 includes a grabber mechanism 1244, a shoulder wheel 1246, an extension motor 1248, a rotation motor 1250, a pair of gearboxes 1252, a pair of telescoping drive shafts 1254, a pair of shoulder brakes 1256, a pair of shoulder clutches 1258, a pair of drive clutches 1260, a pair of extension brakes 1262, a grabber wheel 1264, a grabber tube section 1266, a telescoping tube section 1268, a telescoping tube brake 1270, and shoulder drive shafts 1272.

In some instances, the shoulder wheel 1246 includes gear teeth configured to mesh with and engage with threads of each of the shoulder drive shafts 1272. In some instances, the shoulder brakes 1256 are each rotatably engaged with a corresponding one of the shoulder drive shafts 1272. The shoulder brakes 1256 are further configured to be selectively engaged and disengaged to allow or prevent rotation of the corresponding shoulder drive shafts 1272. In some instances, the shoulder clutches 1258 are each rotatably engaged with both a corresponding one of the shoulder drive shafts 1272 and a corresponding output of one of the gearboxes 1252. The shoulder clutches 1258 are configured to be selectively engaged and disengaged to rotatably couple and decouple the corresponding one of the shoulder drive shafts 1272 to the corresponding output of one of the gearboxes 1252.

In some instances, the extension motor 1248 is rotatably coupled and configured to provide rotational motion to an input of one of the gearboxes 1252. The rotation motor 1250 is rotatably coupled and configured to provide rotational motion to an input of the other of the gearboxes 1252. In some instances, the drive clutches 1260 are each rotatably engaged with a corresponding output of one of the gearboxes 1252 and a corresponding one of the telescoping drive shafts 1254. The drive clutches 1260 are configured to be selectively engaged and disengaged to rotatably couple and decouple the corresponding output of the gearbox 1252 to the corresponding telescoping drive shaft 1254.

In some instances, the pair of extension brakes 1262 and/or the telescoping tube brake 1270 are configured to be selectively engaged and/or disengaged to control various elements of the side loader lift assembly 1240, such as the extension of the telescoping drive shafts 1254 and relative movement between the grabber wheel 1264, the grabber tube section 1266, and the telescoping tube section 1268, as will be described below. For example, in some instances, the telescoping drive shafts 1254 are selectively extendable and the pair of extension brakes 1262 and/or the telescoping tube brake 1270 may be configured to selective prevent the telescoping drive shafts 1254 from extending and/or retracting. Similarly, in some instances, the telescoping tube section 1268 may be configured to move axially with respect to the telescoping drive shafts 1254, the grabber wheel 1264, and/or the grabber tube section 1266. In some instances, the pair of extension brakes 1262 and/or the telescoping tube brake 1270 may be configured to selectively prevent the telescoping tube section 1268 from moving axially with respect to the telescoping drive shafts 1254, the grabber wheel 1264, and/or the grabber tube section 1266. Similarly, in some instances, the grabber wheel 1264 may be configured to move axially with respect to the telescoping drive shafts 1254 and/or the telescoping tube section 1268 and rotationally about a central axis of the grabber wheel 1264. However, in some instances, the pair of extension brakes 1262 and/or the telescoping tube brake 1270 may be configured to selectively prevent respective axial movement between the grabber wheel 1264 and the telescoping drive shafts 1254 and/or the telescoping tube section. 1268. Similarly, in some instances, the pair of extension brakes 1262 and/or the telescoping tube brake 1270 may be configured to selectively prevent rotational motion of the grabber wheel 1264.

In some instances, the side loader lift assembly 1240 is operable to perform a variety of functions. For example, the side loader lift assembly 1240 may be operable to perform a nesting function (shown in FIGS. 21 and 22), an extension function (shown in FIG. 23), a grabber rotation function, (shown in FIG. 24), a retract function (shown in FIG. 25), an arm rotation function (shown in FIG. 26), and a refuse container shake out function (shown in FIG. 27).

Figure 22:
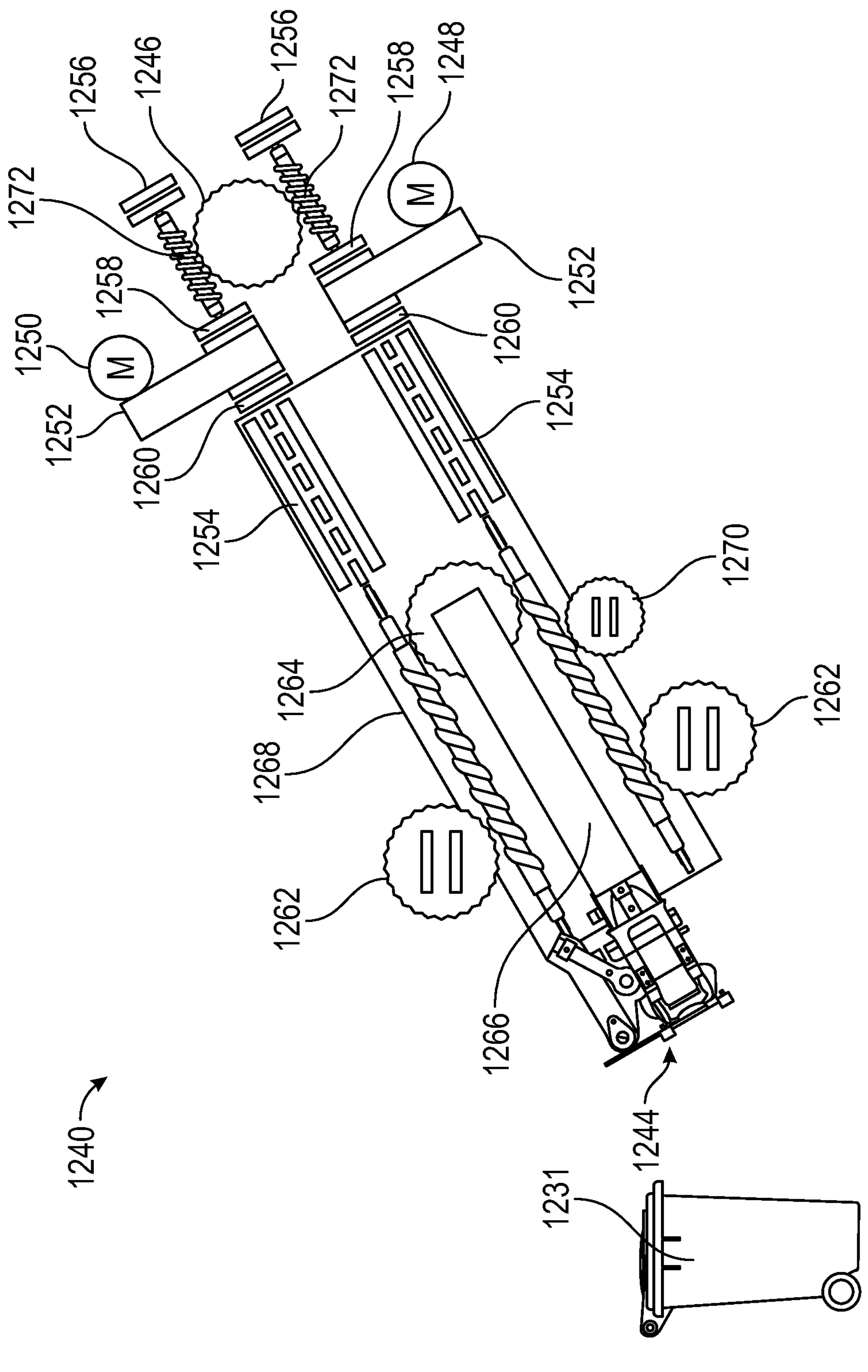
FIG. 22 is a schematic front view of the side loader lift assembly of FIG. 21, shown in a nested position, according to an exemplary embodiment.

For example, referring to FIGS. 21 and 22, the side loader lift assembly 1240 is shown performing the nesting function (e.g., is in a nesting position). The side loader lift assembly 1240 may be configured to perform the nesting function while the refuse vehicle 1210 is traveling. While performing the nesting function, the shoulder brakes 1256, the shoulder clutches 1258, and the drive clutches 1260 are engaged, thereby preventing the various components of the side loader lift assembly 1240 from moving with respect to each other. In some embodiments, alternatively or additionally, the shoulder brakes 1256 may hold rotation and the extension brakes 1262 may be engaged to prevent extension of the grabber tube section 1266.

Figure 23:
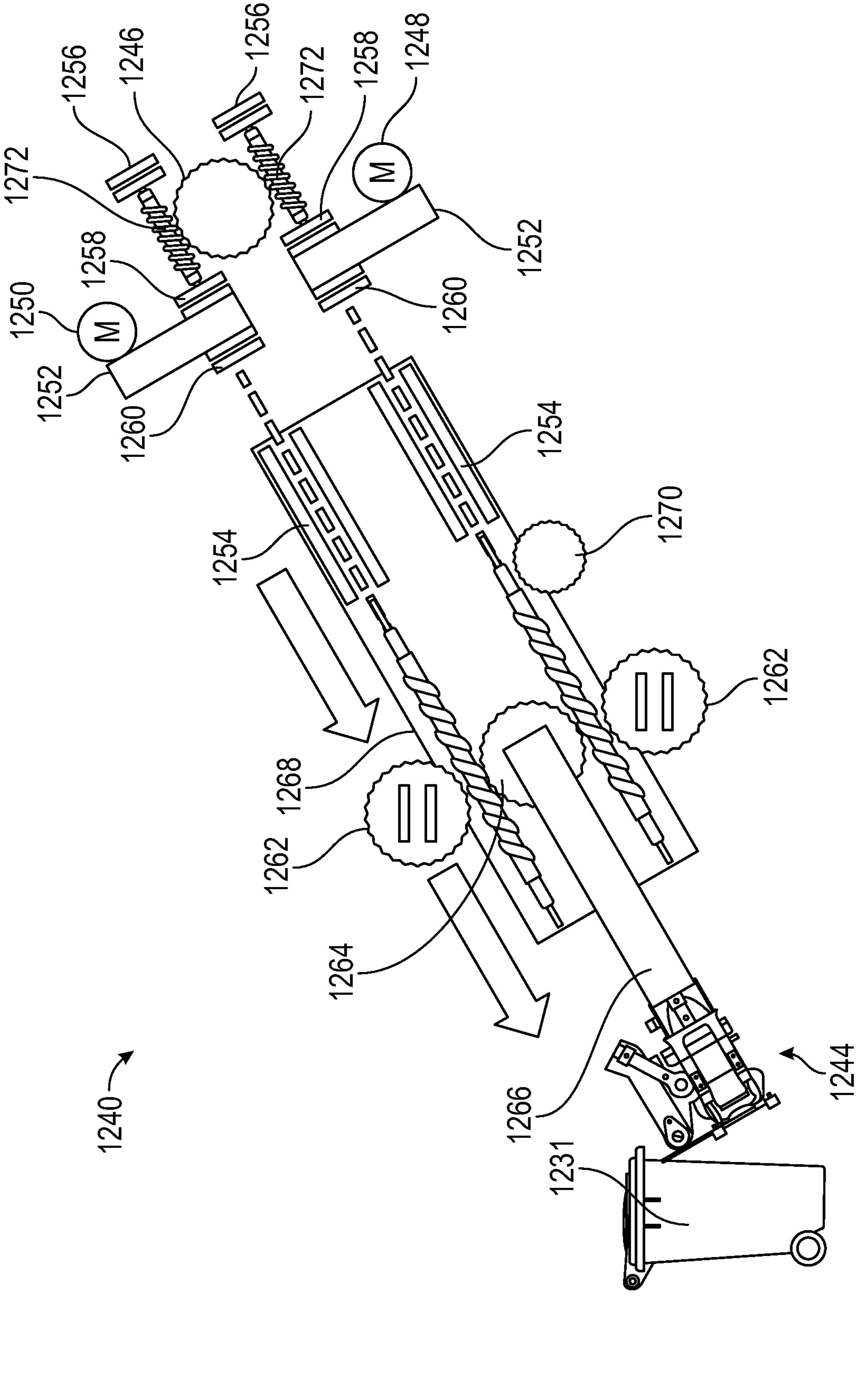
FIG. 23 is a schematic front view of the side loader lift assembly of FIG. 21, shown in an extended position, according to an exemplary embodiment.

Referring to FIG. 23, the side loader lift assembly 1240 is shown performing the extension function (e.g., is in an extended position). While performing the extension function, the shoulder brakes 1256 may be engaged to hold rotation of the side loader lift assembly 1240. The shoulder clutches 1258 may be disengaged to allow for the extension motor 1248 and rotation motor 1250 to rotate in opposite directions, providing rotational motion through the gearboxes 1252 to move the grabber wheel 1264 outward via the telescoping drive shafts 1254, thereby also moving the grabber tube section 1266 outward. Further, the extension brakes 1262 may be engaged, thereby moving the telescoping tube section 1268 outward, with the telescoping tube brake 1270 opened, thereby extending the telescoping drive shafts 1254.

Figure 24:
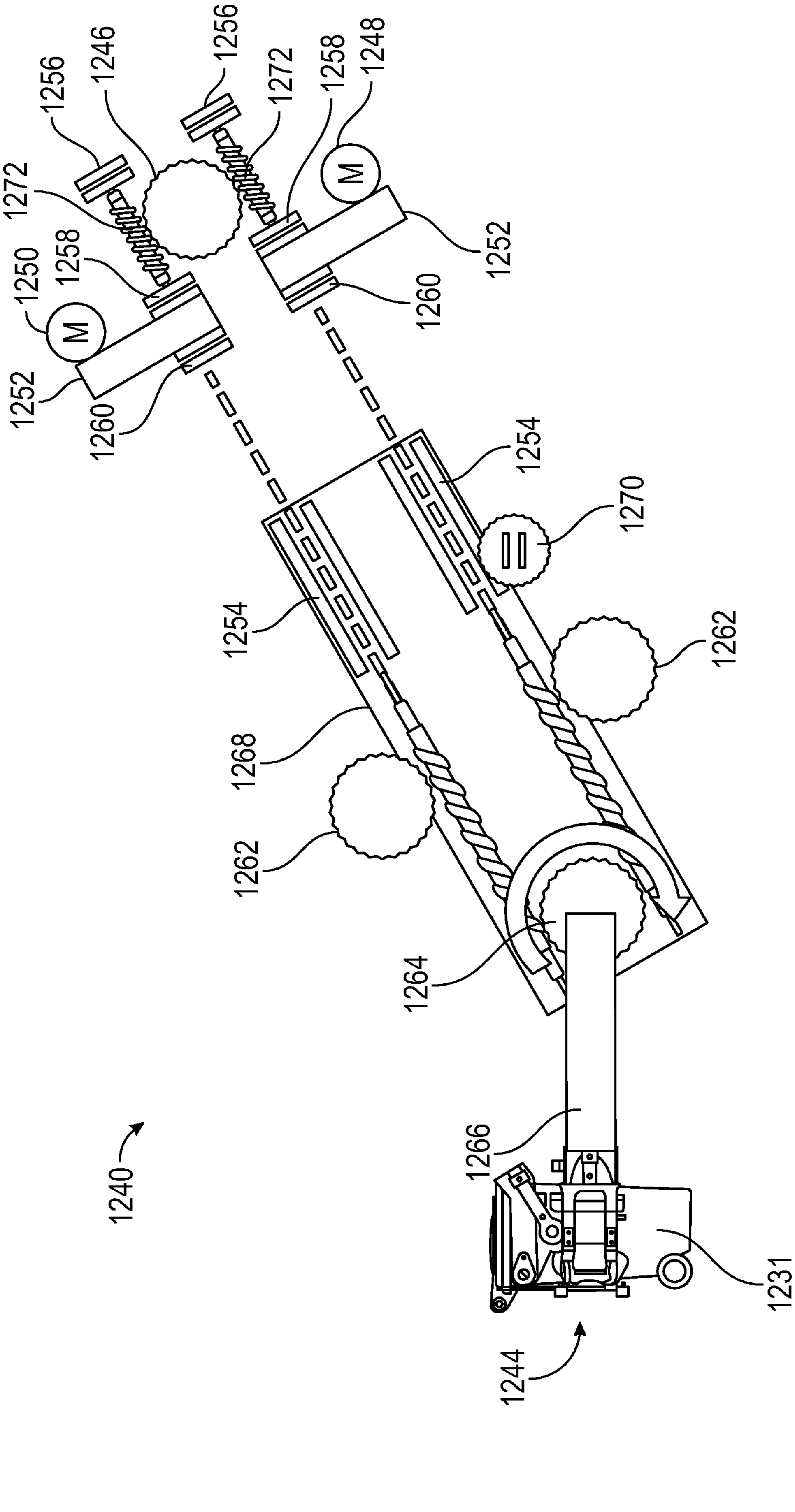
FIG. 24 is a schematic front view of the side loader lift assembly of FIG. 21, shown performing a grabber rotation function, according to an exemplary embodiment.

Referring to FIG. 24, the side loader lift assembly 1240 is shown performing the grabber rotation function. While performing the grabber rotation function, the shoulder brakes 1256 are engaged to hold rotation of the side loader lift assembly 1240. The shoulder clutches 1258 are opened or disengaged to allow the extension motor 1248 and rotation motor 1250 to rotate in the same direction through the drive clutches 1260 to rotate the grabber wheel 1264 via the telescoping drive shafts 1254, thereby rotating the grabber tube section 1266. Additionally, the telescoping tube brake 1270 is engaged, such that the telescoping tube section 1268 is held stationary with respect to the grabber wheel 1264. In some embodiments, the extension motor 1248 and the rotation motor 1250 could spin at different speeds, or different gear ratios may be applied to each of the extension motor 1248 and the rotation motor 1250 via the gearboxes 1252, such that the extension function and the grabber rotation function may be performed simultaneously.

Figure 25:
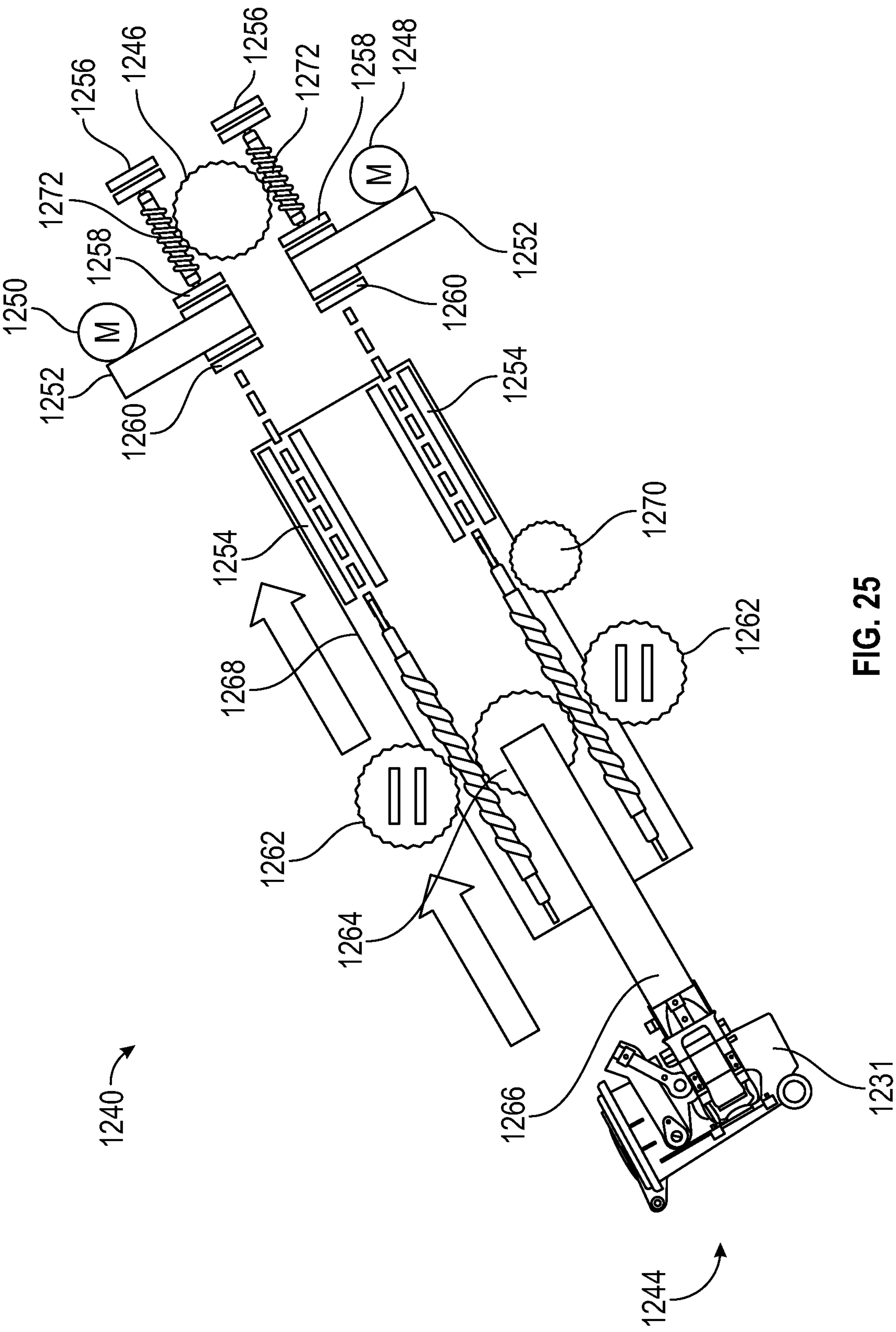
FIG. 25 is a schematic front view of the side loader lift assembly of FIG. 21, shown performing a retract function, according to an exemplary embodiment.

Referring to FIG. 25, the side loader lift assembly 1240 is shown performing the retract function. While performing the retract function, the shoulder brakes 1256 are similarly engaged to hold rotation of the side loader lift assembly 1240. The shoulder clutches 1258 are opened or disengaged to allow the extension motor 1248 and the rotation motor 1250 to rotate in opposite directions through the drive clutches 1260 to move the grabber wheel 1264 and the grabber tube section 1266 inward via the telescoping drive shafts 1254. Additionally, the extension brakes 1262 may be engaged to move the telescoping tube section 1268 inward, with the telescoping tube brake 1270 opened or disengaged, and retract the telescoping drive shafts 1254.

Figure 26:
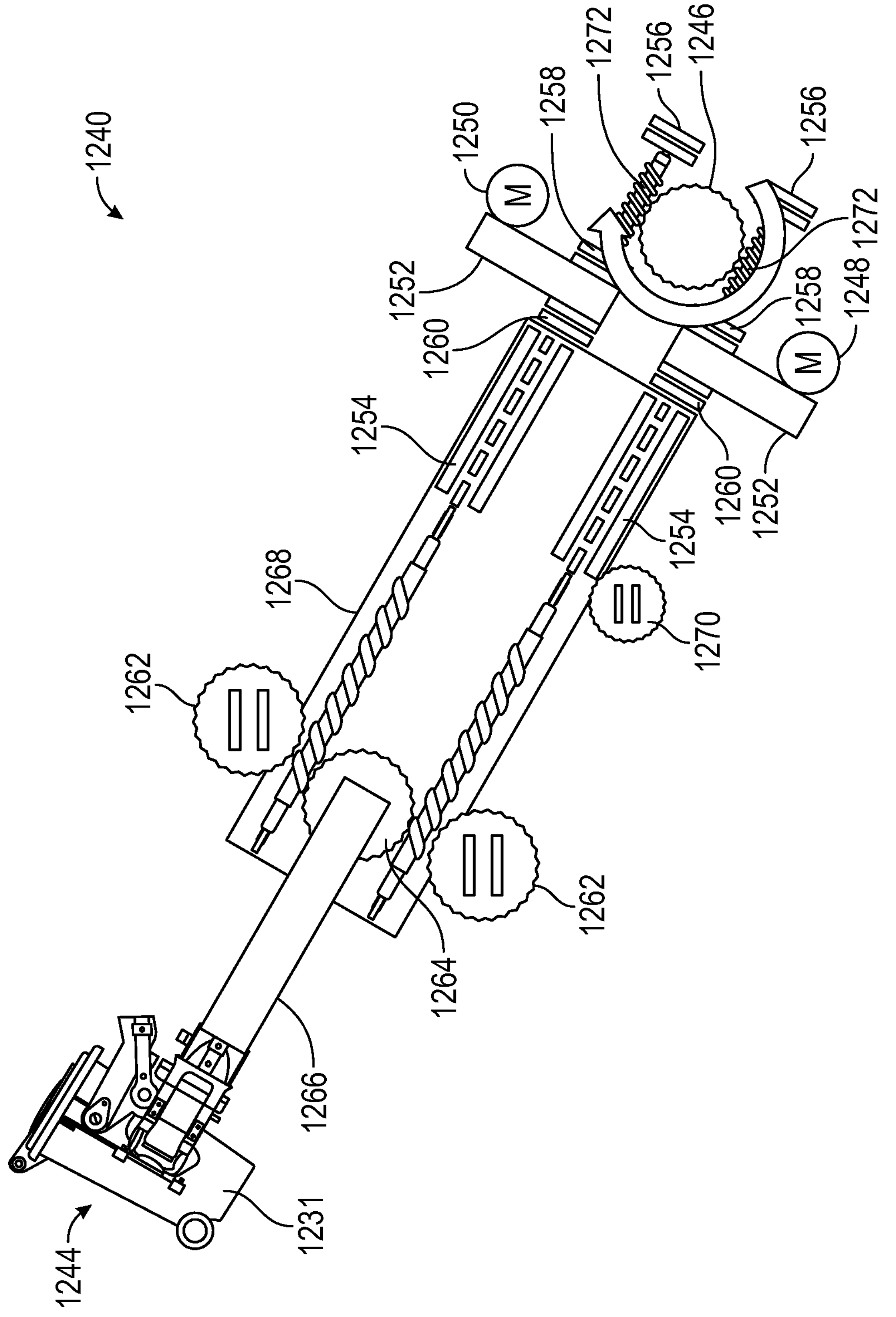
FIG. 26 is a schematic front view of the side loader lift assembly of FIG. 21, shown performing an arm rotation function, according to an exemplary embodiment.

Referring to FIG. 26, the side loader lift assembly 1240 is shown performing the arm rotation function. While performing the arm rotation function, the shoulder clutches 1258 are engaged and the extension motor 1248 and the rotation motor 1250 are configured to rotate the side loader lift assembly 1240 up, with respect to the ground, about the shoulder wheel 1246 via the shoulder drive shafts 1272. While the extension motor 1248 and the rotation motor 1250 are rotating the side loader lift assembly 1240, the drive clutches 1260 are opened or disengaged, such that the grabber wheel 1264 is not driven. Meanwhile, the extension brakes 1262 are configured to hold the position of the grabber wheel 1264.

Figure 27:
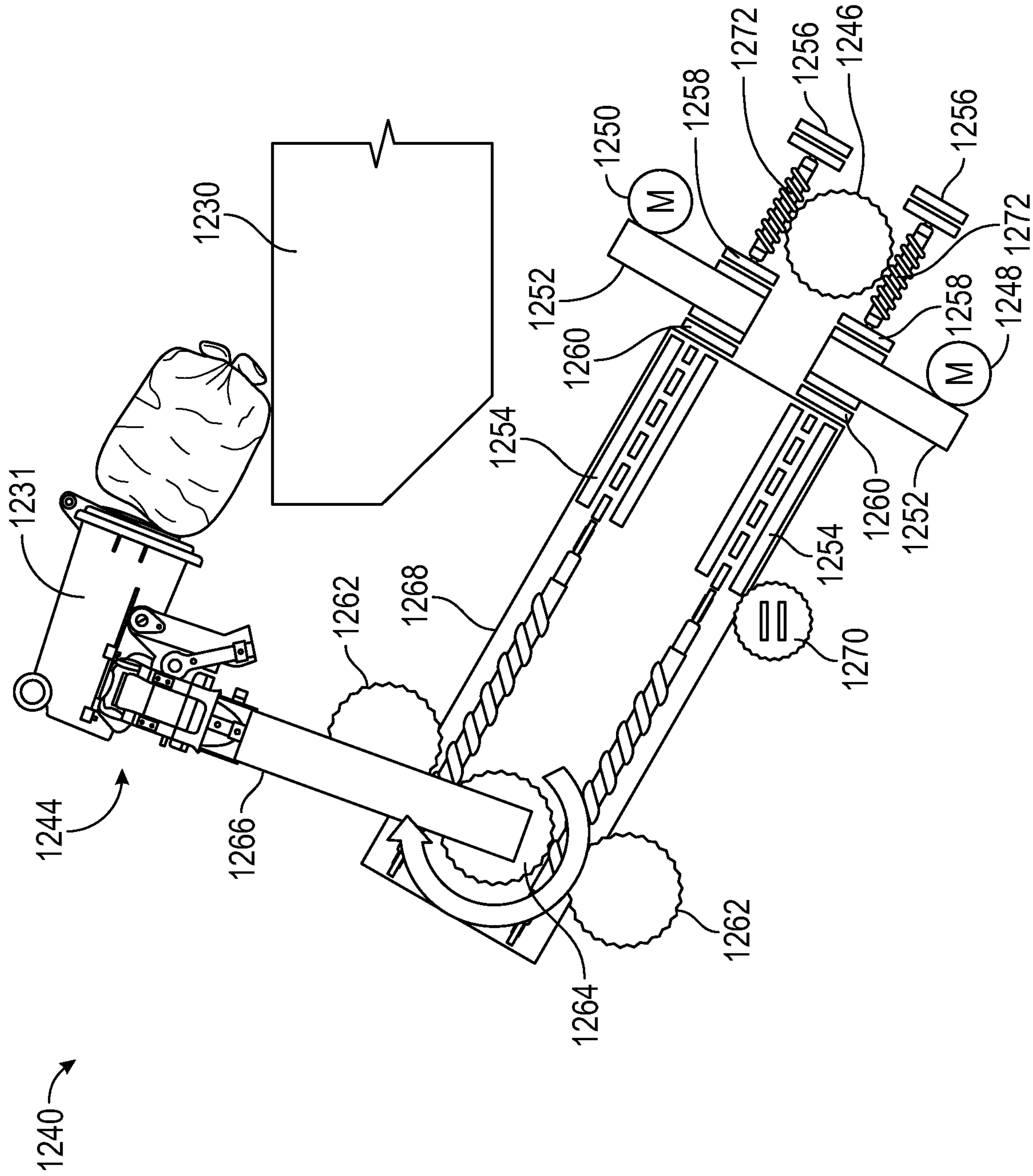
FIG. 27 is a schematic front view of the side loader lift assembly of FIG. 21, shown performing a refuse container shake out function, according to an exemplary embodiment.

Referring to FIG. 27, the side loader lift assembly 1240 is shown performing the refuse container shake out function. While performing the refuse container shake out function, the drive clutches 1260 are engaged and the extension motor 1248 and the rotation motor 1250 are configured to rotate in the same alternating directions (i.e., both rotate clockwise and then both rotate counter clockwise) to shake the refuse container 1231 to empty the refuse container 1231 into the refuse compartment 1230 of the refuse vehicle 1210. Further, while performing the refuse container shake out function, the shoulder brakes 1256 may be engaged to hold the remainder of the side loader lift assembly 1240 stationary.

As utilized herein, the terms “approximately,” “about,” “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the constructions and arrangements of the various refuse vehicles, systems, and components thereof as shown in the various exemplary embodiments are illustrative only. Additionally, any element disclosed in one embodiment may be incorporated or utilized with any other embodiment disclosed herein. For example, in some instances, the slew motor 670 of the automated reach arm 642 may be incorporated into the side loader lift assembly 1240 to allow for the side loader lift assembly 1240 to be selectively swung laterally (or side-to-side), with respect to the ground. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle comprising:
a chassis;
a body assembly coupled to the chassis and defining a refuse compartment configured to store refuse material; and
an automated reach arm comprising:
a refuse container engagement mechanism configured to selectively engage a refuse container;
at least one electrically driven actuation mechanism configured to selectively actuate the automated reach arm between an extended position, a retracted position, and a refuse-dumping position;
a first slew motor configured to selectively swing the automated reach arm with respect to the body assembly about a first axis; and
a second slew motor configured to selectively swing the refuse container engagement mechanism with respect to a second axis that is parallel to the first axis;
a first articulating arm segment hingedly coupled to the body assembly; and
a second articulating arm segment hingedly coupled to the first articulating arm segment and the refuse container engagement mechanism, wherein the first articulating arm segment is configured to rotate with respect to the second articulating arm segment about a third axis that is perpendicular to the first axis and the second axis,
wherein the at least one electrically driven actuation mechanism comprises:
a first articulation motor configured to selectively rotate the first articulating arm segment with respect to the body assembly about a fourth axis, the fourth axis being parallel to the third axis; and
a second articulation motor configured to selectively rotate the second articulating arm segment with respect to the first articulating arm segment about the third axis.

2. The refuse vehicle of claim 1, wherein the at least one electrically driven actuation mechanism is at least one electrically driven ball screw actuator.

3. The refuse vehicle of claim 1, further comprising a refuse container engagement mechanism tilt motor configured to selectively tilt the refuse container engagement mechanism with respect to a third axis that is perpendicular to the first axis and the second axis.

4. The refuse vehicle of claim 1, wherein the refuse container engagement mechanism is a grabber mechanism including grabber fingers and a grabber motor configured to selectively move the grabber fingers between a receiving position, where the grabber mechanism is configured to receive the refuse container, and a grasping position, where the grabber mechanism is configured to engage the refuse container.

5. The refuse vehicle of claim 1, further comprising a battery system configured to be charged via at least one of an on-board electrical energy generator, an external power source, or a power regenerative braking system.

6. The refuse vehicle of claim 1, wherein the automated reach arm includes one of a crane lift assembly, a telescoping lift assembly, or a scissor lift assembly.

7. A refuse vehicle comprising:
a chassis;
a body assembly coupled to the chassis and defining a refuse compartment configured to store refuse material; and
an automated reach arm comprising:
a grabber mechanism configured to selectively engage a refuse container;
at least one electric actuator configured to selectively actuate the automated reach arm between an extended position, a retracted position, and a refuse-dumping position;
a first slew motor configured to selectively swing the automated reach arm with respect to the body assembly about a first axis;
a second slew motor configured to selectively swing the grabber mechanism with respect to a second axis that is parallel to the first axis; and
a grabber mechanism tilt motor configured to selectively tilt the grabber mechanism with respect to a third axis that is perpendicular to the first axis and the second axis;
a first articulating arm segment hingedly coupled to the body assembly: and
a second articulating arm segment hingedly coupled to the first articulating arm segment and the grabber mechanism, wherein the first articulating arm segment is configured to rotate with respect to the second articulating arm segment about a fourth axis that is parallel to the third axis;
wherein the at least one electric actuator comprises:
a first articulation motor configured to selectively rotate the first articulating arm segment with respect to the body assembly about a fifth axis, the fifth axis being parallel to the third axis; and
a second articulation motor configured to selectively rotate the second articulating arm segment with respect to the first articulating arm segment about the fourth axis.

8. The refuse vehicle of claim 7, wherein the at least one electric actuator is at least one electrically driven ball screw actuator.

9. The refuse vehicle of claim 7, wherein the grabber mechanism includes grabber fingers and a grabber motor configured to selectively move the grabber fingers between a receiving position, where the grabber mechanism is configured to receive the refuse container, and a grasping position, where the grabber mechanism is configured to engage the refuse container.

10. The refuse vehicle of claim 7, further comprising a battery system configured to be charged via at least one of an on-board electrical energy generator, an external power source, or a power regenerative braking system.

11. The refuse vehicle of claim 7, wherein the automated reach arm includes one of a crane lift assembly, a telescoping lift assembly, or a scissor lift assembly.

12. A refuse vehicle comprising:
a chassis;
a body assembly coupled to the chassis and defining a refuse compartment configured to store refuse material; and
an automated reach arm comprising:
a refuse container engagement mechanism configured to selectively engage a refuse container;
a first articulating arm segment hingedly coupled to the body assembly;

a second articulating arm segment hingedly coupled to the first articulating arm segment and the refuse container engagement mechanism, wherein the automated reach arm is configured to extend in a first direction from a retracted position to an extended position, the first articulating arm segment is configured to rotate with respect to the second articulating arm segment about a first axis, the first axis is perpendicular to the first direction; and an electric actuator configured to selectively rotate the first articulating arm segment and the second articulating arm segment with respect to one another to selectively actuate the automated reach arm between the extended position, the retracted position, and a refuse-dumping position;

a slew motor configured to selectively swing the refuse container engagement mechanism with respect to the second articulating arm segment about a second axis that is perpendicular to the first axis; and a refuse container engagement mechanism tilt motor configured to selectively tilt the refuse container engagement mechanism with respect to the second articulating arm segment about a third axis, parallel to the first axis.

13. The refuse vehicle of claim 12, further comprising an articulation motor configured to selectively rotate the first articulating arm segment with respect to the body assembly about a third axis, the third axis being parallel to the first axis.

14. The refuse vehicle of claim 12, further comprising an articulation motor configured to selectively rotate the second articulating arm segment with respect to the first articulating arm segment about the first axis.

15. The refuse vehicle of claim 12, further comprising a battery system configured to be charged via at least one of an on-board electrical energy generator, an external power source, or a power regenerative braking system, wherein the electric actuator is powered by the battery system.

16. A refuse vehicle comprising:

a chassis;

a body assembly coupled to the chassis and defining a refuse compartment configured to store refuse material; and an automated reach arm comprising:

a refuse container engagement mechanism configured to selectively engage a refuse container;

a first articulating arm segment hingedly coupled to the body assembly;

a second articulating arm segment hingedly coupled to the first articulating arm segment and the refuse container engagement mechanism, wherein the automated reach arm is configured to extend in a first direction from a retracted position to an extended position, the first articulating arm segment is configured to rotate with respect to the second articulating arm segment about a first axis, the first axis is perpendicular to the first direction; and an electric actuator configured to selectively rotate the first articulating arm segment and the second articulating arm segment with respect to one another to selectively actuate the automated reach arm between the extended position, the retracted position, and a refuse-dumping position;

a slew motor configured to selectively swing the refuse container engagement mechanism with respect to the second articulating arm segment about a second axis that is perpendicular to the first axis; and an articulation motor configured to selectively rotate the first articulating arm segment with respect to the body assembly about a third axis, the third axis being parallel to the first axis.

17. The refuse vehicle of claim 16, wherein the articulation motor is a first articulation motor, and the refuse vehicle further comprises a second articulation motor configured to selectively rotate the second articulating arm segment with respect to the first articulating arm segment about the first axis.

18. The refuse vehicle of claim 16, further comprising a battery system configured to be charged via at least one of an on-board electrical energy generator, an external power source, or a power regenerative braking system, wherein the electric actuator is powered by the battery system.

* * * * *